US011824662B2

(12) United States Patent
Kung et al.

(10) Patent No.: US 11,824,662 B2
(45) Date of Patent: Nov. 21, 2023

(54) METHOD AND APPARATUS FOR DISCONTINUOUS RECEPTION REGARDING PUCCH TRANSMISSION IN A WIRELESS COMMUNICATION SYSTEM

(71) Applicant: ASUS Technology Licensing Inc., Taipei (TW)

(72) Inventors: Yi-Hsuan Kung, Taipei (TW); Yu-Hsuan Guo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/133,420

(22) Filed: Apr. 11, 2023

(65) Prior Publication Data

US 2023/0344562 A1 Oct. 26, 2023

Related U.S. Application Data

(60) Provisional application No. 63/333,944, filed on Apr. 22, 2022.

(51) Int. Cl.
*H04L 1/1829* (2023.01)
*H04W 76/28* (2018.01)

(52) U.S. Cl.
CPC .......... *H04L 1/1848* (2013.01); *H04L 1/1854* (2013.01); *H04W 76/28* (2018.02)

(58) Field of Classification Search
CPC ..... H04L 1/1848; H04L 1/1854; H04W 76/28
USPC .......................................................... 370/329
See application file for complete search history.

(56) References Cited

U.S. PATENT DOCUMENTS

2021/0251037 A1* 8/2021 Akkarakaran ........ H04W 72/23
2022/0312241 A1 9/2022 Xu et al.
2022/0330306 A1* 10/2022 Zhang .................. H04W 72/23
2023/0019726 A1* 1/2023 Kwon .................. H04L 1/0026
2023/0097552 A1* 3/2023 Freda .................. H04L 1/1848 370/329
2023/0112798 A1* 4/2023 Lee ...................... H04W 76/28 370/329

* cited by examiner

*Primary Examiner* — Mang Hang Yeung
(74) *Attorney, Agent, or Firm* — Skaar Ulbrich Macari, P.A.

(57) ABSTRACT

Methods, systems, and apparatuses can comprise receiving a Sidelink (SL) grant, wherein the SL grant indicates a SL transmission, starting or restarting a first timer for a SL Hybrid Automatic Repeat Request (HARQ) process in a first symbol after the end of a Physical Uplink Control Channel (PUCCH) resource associated with the SL grant, or the SL transmission, when the first device does not transmit a SL HARQ feedback for the SL HARQ process on the PUCCH resource due to measurement gap or Listen-Before-Talk (LBT) failure, starting or restarting a second timer for the SL HARQ process in a first symbol, after the first timer expires, when the first device does not transmit the SL HARQ feedback for the SL HARQ process on the PUCCH resource due to measurement gap, or LBT failure, and the SL HARQ feedback is a negative acknowledgement, and monitoring a Physical Downlink Control Channel (PDCCH) when the second timer is running.

20 Claims, 15 Drawing Sheets

METHOD AND APPARATUS FOR DISCONTINUOUS RECEPTION REGARDING PUCCH TRANSMISSION IN A WIRELESS COMMUNICATION SYSTEM

CROSS-REFERENCE TO RELATED APPLICATIONS

The present Application claims priority to and the benefit of U.S. Provisional Patent Application Ser. No. 63/333,944, filed Apr. 22, 2022, which is fully incorporated herein by reference.

FIELD

This disclosure generally relates to wireless communication networks and, more particularly, to a method and apparatus for discontinuous reception regarding PUCCH transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for handling Physical Downlink Control Channel (PDCCH) monitoring associated with Sidelink (SL) communication regarding measurement gap and Listen-Before-Talk (LBT) failure. In various embodiments of the present invention, a method for a first device in a wireless communication system comprises receiving a SL grant, wherein the SL grant indicates a SL transmission, starting or restarting a first timer for a SL Hybrid Automatic Repeat Request (HARQ) process in a first symbol after the end of a Physical Uplink Control Channel (PUCCH) resource associated with the SL grant, or the SL transmission, when the first device does not transmit a SL HARQ feedback for the SL HARQ process on the PUCCH resource due to a measurement gap or a LBT failure, starting or restarting a second timer for the SL HARQ process in a first symbol, after expiration of the first timer, when the first device does not transmit the SL HARQ feedback for the SL HARQ process on the PUCCH resource due to the measurement gap, or the LBT failure, and the SL HARQ feedback is a Negative Acknowledgement (NACK), and monitoring a PDCCH when the second timer is running.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP 38.321 v17.0.0; [2] 3GPP 38.331 v17.0.0; and [3] 3GPP 38.300 v17.0.0. The standards and documents listed above are hereby expressly and fully incorporated herein by reference in their entirety.

Figure 1:
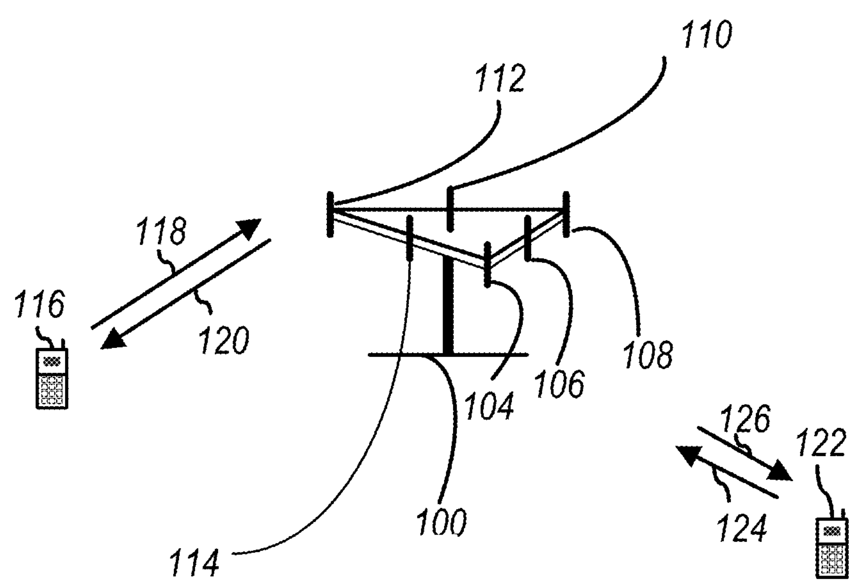
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
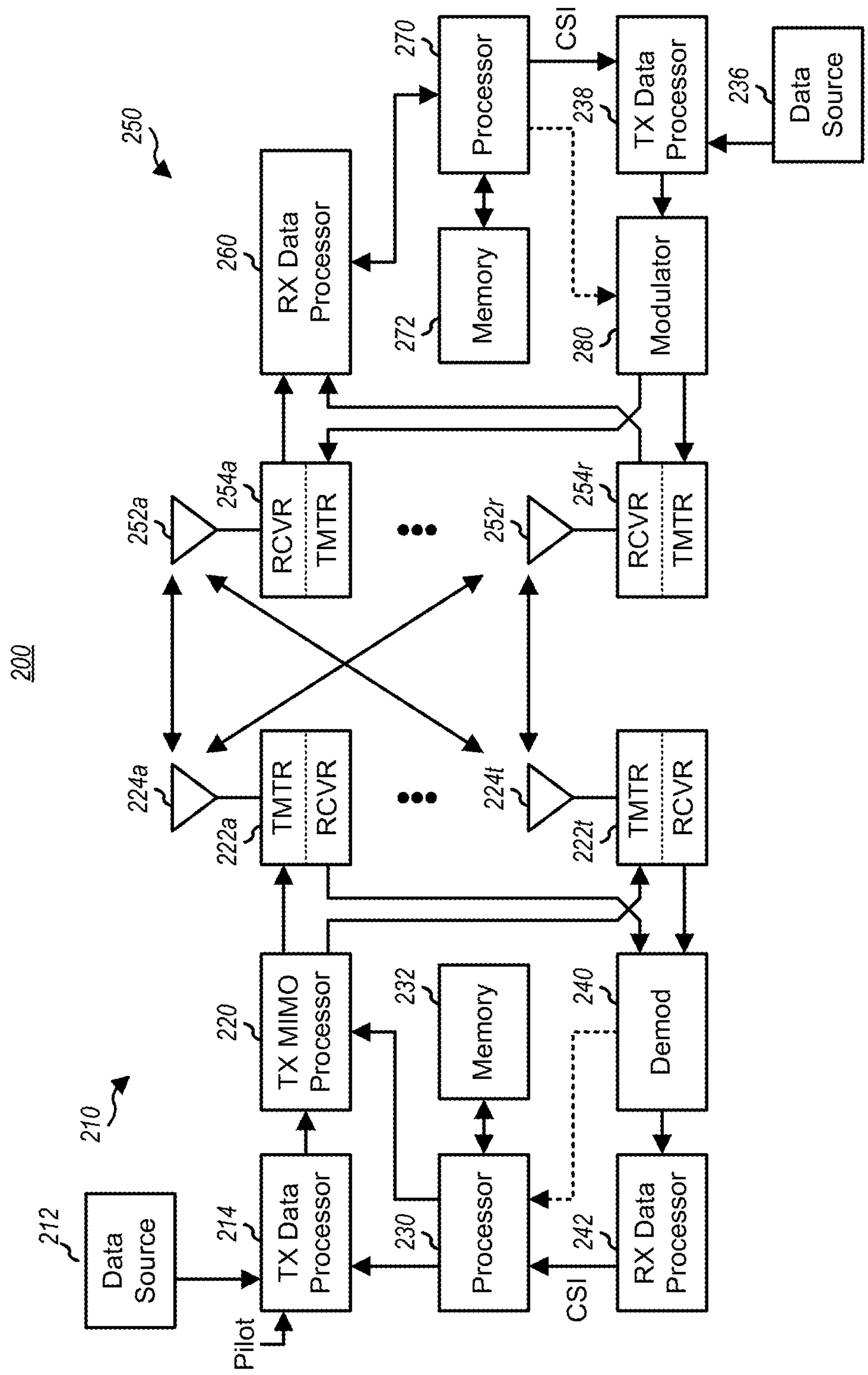
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222*a* through 222*t* are then transmitted from NT antennas 224*a* through 224*t*, respectively.

At receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source

236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
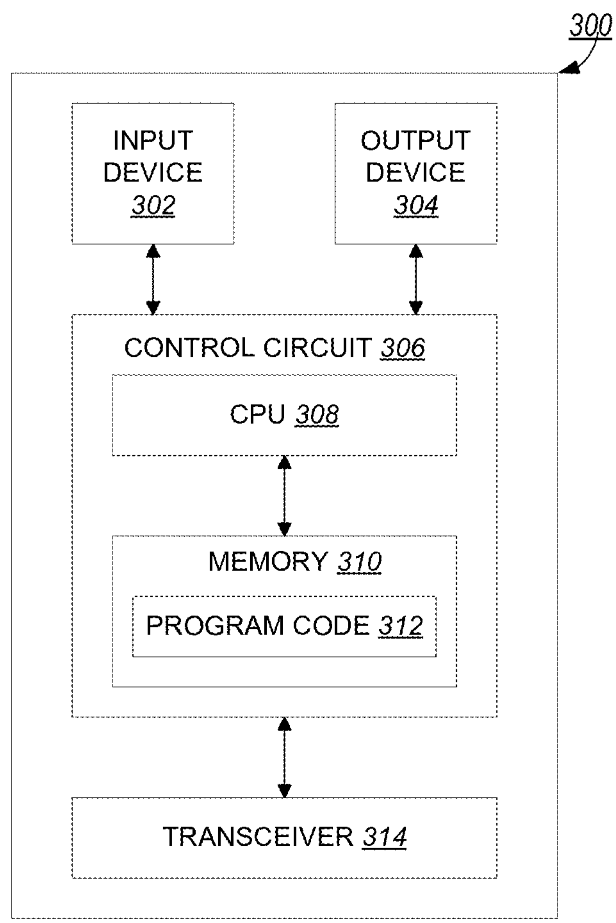
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
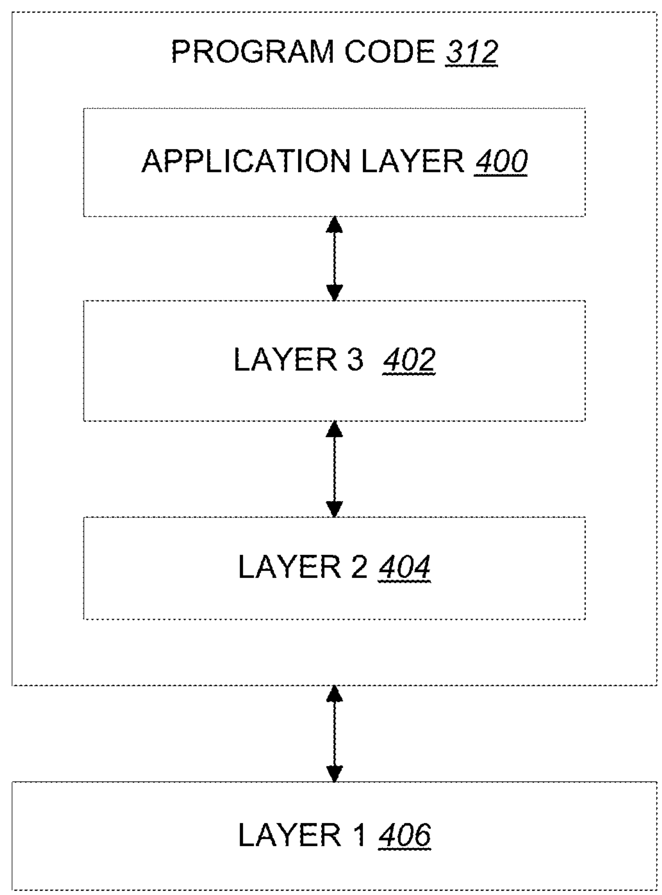
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In the 3GPP specification ([1] 3GPP 38.321 v17.0.0), Medium Access Control (MAC) architecture, MAC reset, Discontinuous reception (DRX), Uplink/Sidelink (UL/SL) prioritization and sidelink DRX are introduced:

4.2 MAC architecture 4.2.1 General

This clause describes a model of the MAC i.e. it does not specify or restrict implementations.

RRC is in control of the MAC configuration.

4.2.2 MAC Entities

The MAC entity of the UE handles the following transport channels:

- Broadcast Channel (BCH);
- Downlink Shared Channel(s) (DL-SCH);
- Paging Channel (PCH);
- Uplink Shared Channel(s) (UL-SCH);
- Random Access Channel(s) (RACH).

When the UE is configured with SCG, two MAC entities are configured to the UE: one for the MCG and one for the SCG. When the UE is configured with DAPS handover, two MAC entities are used by the UE: one for the source cell (source MAC entity) and one for the target cell (target MAC entity). The functions of the different MAC entities in the UE operate independently unless otherwise specified. The timers and parameters used in each MAC entity are configured independently unless otherwise specified. The Serving Cells, C-RNTI, radio bearers, logical channels, upper and lower layer entities, LCGs, and HARQ entities considered by each MAC entity refer to those mapped to that MAC entity unless otherwise specified.

If the MAC entity is configured with one or more SCells, there are multiple DL-SCH and there may be multiple UL-SCH as well as multiple RACH per MAC entity; one DL-SCH, one UL-SCH, and one RACH on the SpCell, one DL-SCH, zero or one UL-SCH and zero or one RACH for each SCell.

If the MAC entity is not configured with any SCell, there is one DL-SCH, one UL-SCH, and one RACH per MAC entity.

FIG. 4.2.2-1 illustrates one possible structure of the MAC entity when SCG is not configured and for each MAC entity during DAPS handover.

Figure 5:
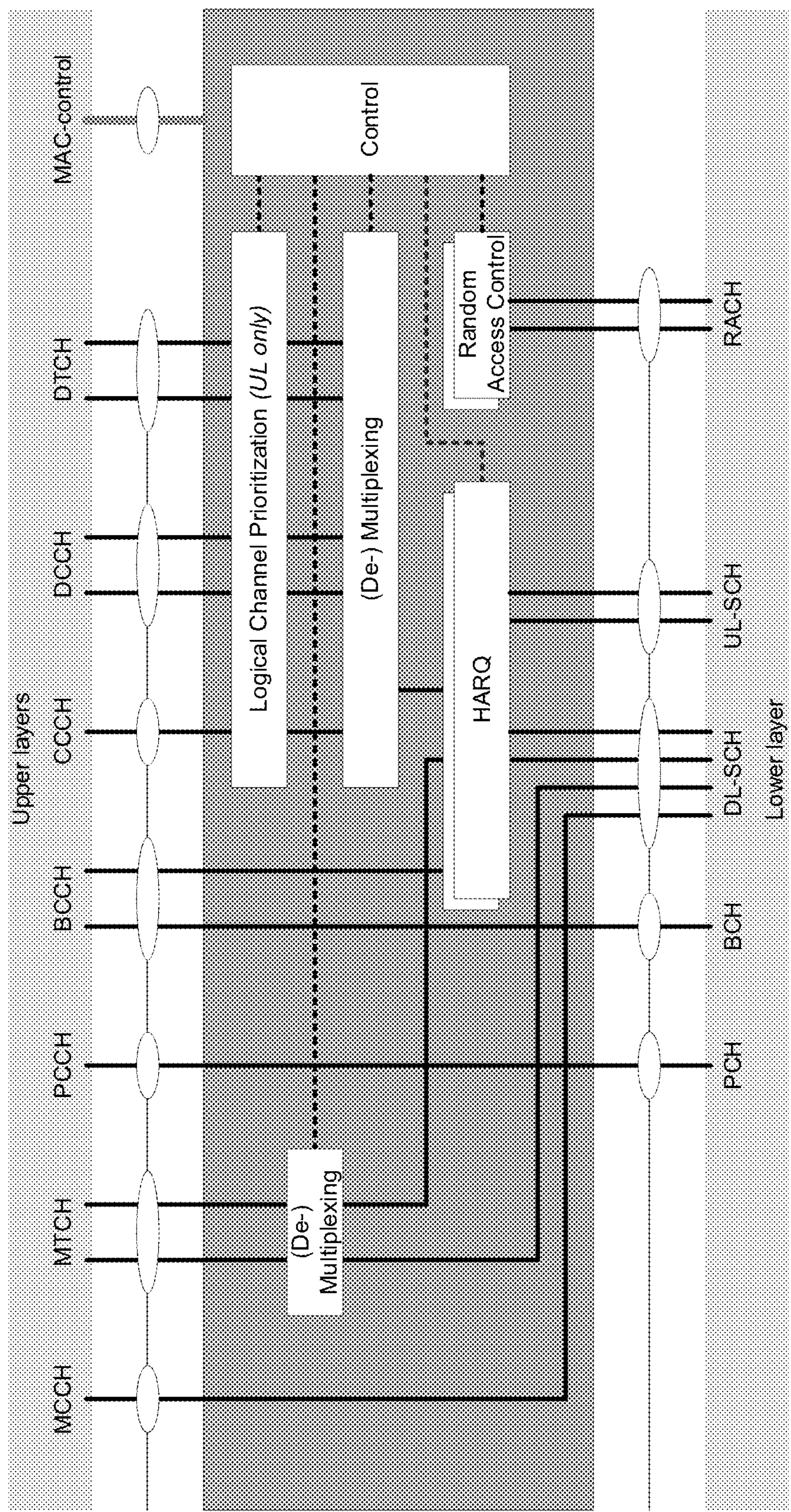
FIG. 5 is a reproduction of FIG. 4.2.2-1: MAC structure overview, from 3GPP 38.321 v17.0.0.

FIG. 5 is a reproduction of FIG. 4.2.2-1: MAC structure overview, from 3GPP 38.321 v17.0.0.

FIG. 4.2.2-2 illustrates one possible structure for the MAC entities when MCG and SCG are configured.

Figure 6:
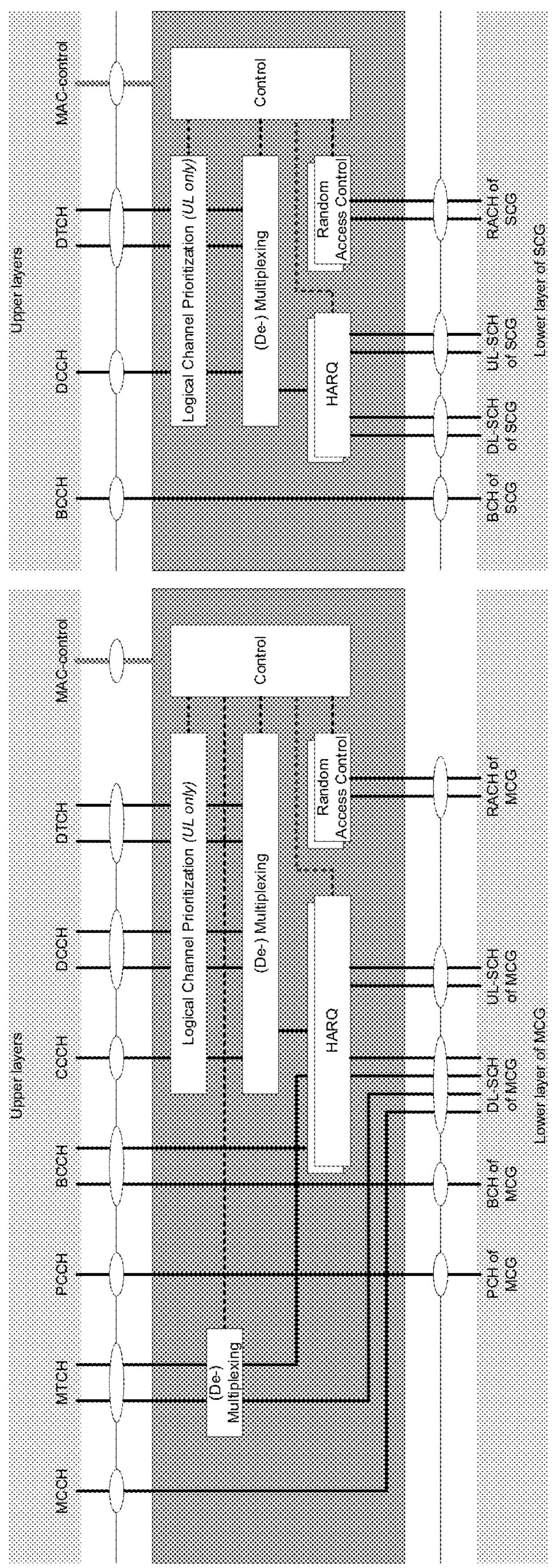
FIG. 6 is a reproduction of FIG. 4.2.2-2: MAC structure overview with two MAC entities, from 3GPP 38.321 v17.0.0.

FIG. 6 is a reproduction of FIG. 4.2.2-2: MAC structure overview with two MAC entities, from 3GPP 38.321 v17.0.0.

In addition, the MAC entity of the UE handles the following transport channel for sidelink:

- Sidelink Shared Channel (SL-SCH);
- Sidelink Broadcast Channel (SL-BCH).

FIG. 4.2.2-3 illustrates one possible structure for the MAC entity when sidelink is configured.

Figure 7:
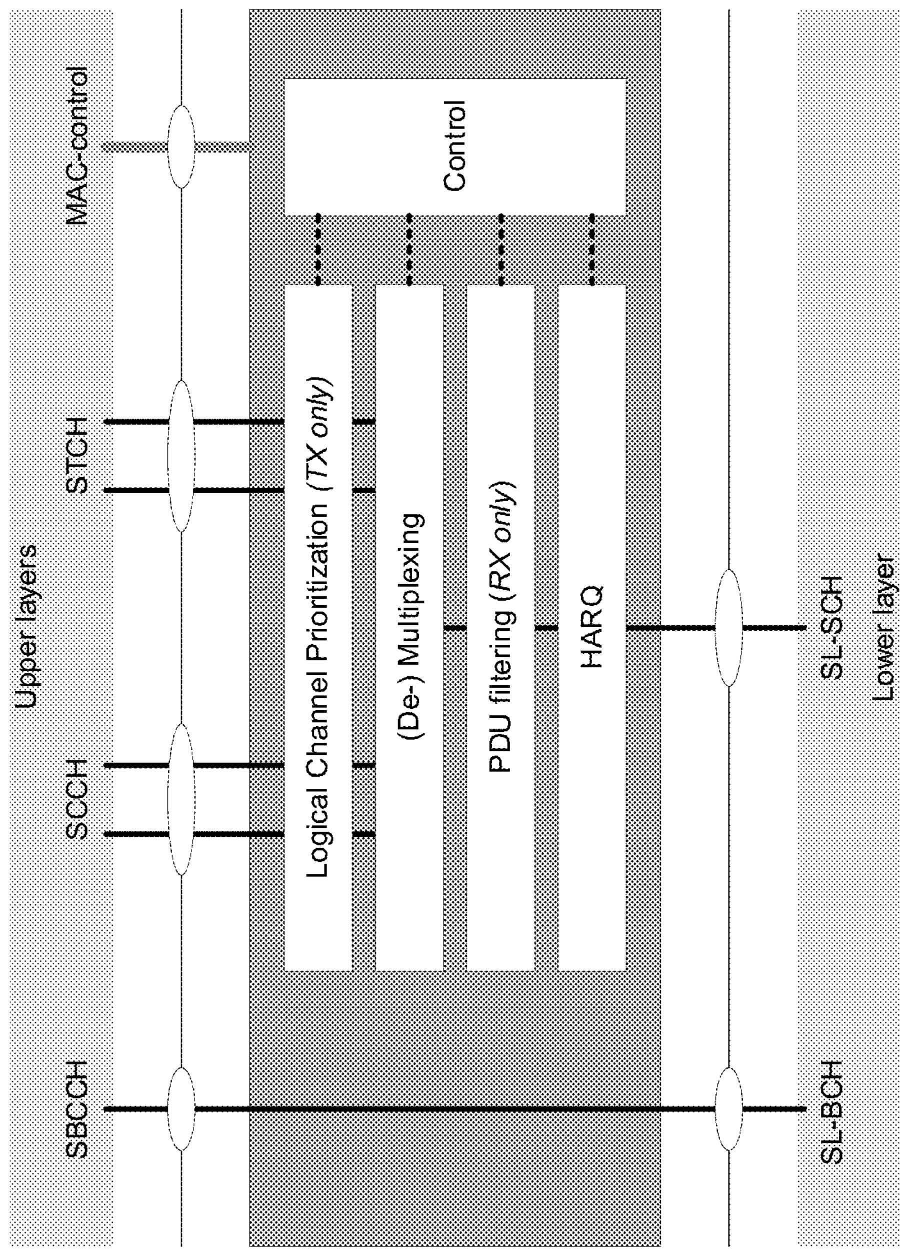
FIG. 7 is a reproduction of FIG. 4.2.2-3: MAC structure overview for sidelink, from 3GPP 38.321 v17.0.0.

FIG. 7 is a reproduction of FIG. 4.2.2-3: MAC structure overview for sidelink, from 3GPP 38.321 v17.0.0.

5.4.2.2 HARQ Process

. . .

The transmission of the MAC PDU is prioritized over sidelink transmission or can be performed simultaneously with sidelink transmission if one of the following conditions is met:

- if there are both a sidelink grant for transmission of NR sidelink communication and configured grant(s) for transmission of V2X sidelink communication on SL-SCH as determined in clause 5.14.1.2.2 of TS 36.321 [22] at the time of the transmission, and neither the transmission of NR sidelink communication is prioritized as determined in clause 5.22.1.3.1a nor the transmission(s) of V2X sidelink communication is prioritized as determined in clause 5.14.1.2.2 of TS 36.321 [22]; or if there are both a sidelink grant for transmission of NR sidelink communication and configured grant(s) for transmission of V2X sidelink communication on SL-SCH as determined in clause 5.14.1.2.2 of TS 36.321 [22] at the time of the transmission, and the MAC entity is able to perform this UL transmission simultaneously with the transmission of NR sidelink communication and/or the transmission(s) of V2X sidelink communication; or if there is only configured grant(s) for transmission of V2X sidelink communication on SL-SCH as determined in clause 5.14.1.2.2 of TS 36.321 [22] at the time of the transmission, and either none of the transmission(s) of V2X sidelink communication is prioritized as determined in clause 5.14.1.2.2 of TS 36.321 [22] or the MAC entity is able to perform this UL transmission simultaneously with the transmission(s) of V2X sidelink communication; or if there is only a sidelink grant for transmission of NR sidelink communication at the time of the transmission, and if the transmission of NR sidelink communication is not prioritized as determined in clause 5.22.1.3.1a, or there is a sidelink grant for transmission of NR sidelink communication at the time of the transmission and the MAC entity is able to perform this UL transmission simultaneously with the transmission of NR sidelink communication; or if there are both a sidelink grant for transmission of NR sidelink communication and configured grant(s) for transmission of V2X sidelink communication on SL-SCH as determined in clause 5.14.1.2.2 of TS 36.321 [22] at the time of the transmission, and either only the transmission of NR sidelink communication is prioritized as determined in clause 5.22.1.3.1a or only the transmission(s) of V2X sidelink communication is prioritized as determined in clause 5.14.1.2.2 of TS 36.321 [22] and the MAC entity is able to perform this UL transmission simultaneously with the prioritized transmission of NR sidelink communication or V2X sidelink communication:

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and SL Semi-Persistent Scheduling V-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: Void

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

drx-RetransmissionTimerSL (per SL HARQ process): the maximum duration until a grant for SL retransmission is received;

drx-HARQ-RTT-TimerSL (per SL HARQ process): the minimum duration before an SL retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started;

uplinkHARQ-Mode (optional): the configuration to set the HARQ mode per UL HARQ process.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-Slot Offset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, drx-HARQ-RTT-TimerUL, and uplinkHARQ-Mode (optional).

When DRX is configured, the Active Time for Serving Cells in a DRX group includes the time while:

drx-onDurationTimer or drx-InactivityTimer configured for the DRX group is running; or drx-RetransmissionTimerDL, drx-RetransmissionTimerUL or drx-RetransmissionTimerSL is running on any Serving Cell in the DRX group; or ra-ContentionResolutionTimer (as described in clause 5.1.5) or msgB-Response Window (as described in clause 5.1.4a) is running; or a Scheduling Request is sent on PUCCH and is pending (as described in clause 5.4.4 or 5.22.15). If this Serving Cell is part of a non-terrestrial network, the Active Time is started after the first Scheduling Request transmission plus the UE-gNB RTT; or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:

2> start the drx-HARQ-RTT-TimerDL for the corresponding HARQ process in the first symbol after the end of the corresponding transmission carrying the DL HARQ feedback;

NOTE 1a: If Serving cell is configured with downlinkHARQ-FeedbackDisabled and DL HARQ feedback is disabled, drx-HARQ-RTT-TimerDL is not started for the corresponding HARQ process.

NOTE 1b: If this Serving Cell is part of a non-terrestrial network, the latest UE-gNB RTT value shall be used to set drx-HARQ-RTT-TimerDL and drx-HARQ-RTT-TimerUL length prior to timer start (see TS 38.331 [5] clause [X]).

2> stop the drx-RetransmissionTimerDL for the corresponding HARQ process.

1> if a MAC PDU is transmitted in a configured uplink grant and LBT failure indication is not received from lower layers:

2> if this Serving Cell is not configured with uplinkHARQ-Mode; or

2> if this Serving Cell is configured with uplinkHARQ-Mode and the corresponding HARQ process is configured as HARQ Mode A:

3> start the drx-HARQ-RTT-TimerUL for the corresponding HARQ process in the first symbol after the end of the first transmission (within a bundle) of the corresponding PUSCH transmission;

2> stop the drx-RetransmissionTimerUL for the corresponding HARQ process at the first transmission (within a bundle) of the corresponding PUSCH transmission.

1> if a drx-HARQ-RTT-TimerDL expires:

2> if the data of the corresponding HARQ process was not successfully decoded:

3> start the drx-RetransmissionTimerDL for the corresponding HARQ process in the first symbol after the expiry of drx-HARQ-RTT-TimerDL.

1> if a drx-HARQ-RTT-TimerUL expires:

2> start the drx-RetransmissionTimerUL for the corresponding HARQ process in the first symbol after the expiry of drx-HARQ-RTT-TimerUL.

1> if a drx-HARQ-RTT-TimerSL expires:

2> if a HARQ NACK feedback for the corresponding HARQ process is transmitted on PUCCH; or 2> if a HARQ NACK feedback for the corresponding HARQ process is not transmitted on PUCCH due to UL/SL prioritization:

3> start the drx-RetransmissionTimerSL for the corresponding HARQ process in the first symbol after the expiry of drx-HARQ-RTT-TimerSL.

2> else if the PUCCH resource is not configured and PSFCH is configured for the SL grant:

3> start the drx-RetransmissionTimerSL for the corresponding HARQ process in the first symbol after the expiry of drx-HARQ-RTT-TimerSL.

NOTE: The UE handles the drx-RetransmissionTimerSL operation when sl-PUCCH-Config is configured by RRC but PUCCH resource is not scheduled same as when sl-PUCCH-Config is not configured.

1> if a DRX Command MAC CE or a Long DRX Command MAC CE is received:

2> stop drx-onDurationTimer for each DRX group;

2> stop drx-InactivityTimer for each DRX group.

1> if drx-InactivityTimer for a DRX group expires:

2> if the Short DRX cycle is configured:

3> start or restart drx-ShortCycleTimer for this DRX group in the first symbol after the expiry of drx-InactivityTimer;

3> use the Short DRX cycle for this DRX group.

2> else:

3> use the Long DRX cycle for this DRX group.

1> if a DRX Command MAC CE is received:

2> if the Short DRX cycle is configured:

3> start or restart drx-ShortCycleTimer for each DRX group in the first symbol after the end of DRX Command MAC CE reception;

3> use the Short DRX cycle for each DRX group.

2> else:

3> use the Long DRX cycle for each DRX group.

1> if drx-ShortCycleTimer for a DRX group expires:

2> use the Long DRX cycle for this DRX group.

1> if a Long DRX Command MAC CE is received:

2> stop drx-ShortCycleTimer for each DRX group;

2> use the Long DRX cycle for each DRX group.

1> if the Short DRX cycle is used for a DRX group, and [(SFN×10)+subframe number] modulo (drx-ShortCycle)=(drx-StartOffset) modulo (drx-ShortCycle):

2> start drx-onDurationTimer for this DRX group after drx-SlotOffset from the beginning of the subframe.

1> if the Long DRX cycle is used for a DRX group, and [(SFN×10)+subframe number] modulo (drx-LongCycle)=drx-StartOffset:

2> if DCP monitoring is configured for the active DL BWP as specified in TS 38.213 [6], clause 10.3:

3> if DCP indication associated with the current DRX cycle received from lower layer indicated to start drx-onDurationTimer, as specified in TS 38.213 [6]; or 3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-Response Window is running (as specified in clause 5.1.4); or 3> if ps-Wakeup is configured with value true and DCP indication associated with the current DRX cycle has not been received from lower layers:

4> start drx-onDurationTimer after drx-SlotOffset from the beginning of the subframe.

2> else:

3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:

2> monitor the PDCCH on the Serving Cells in this DRX group as specified in TS 38.213 [6];

2> if the PDCCH indicates a DL transmission; or

2> if the PDCCH indicates a one-shot HARQ feedback as specified in clause 9.1.4 of TS 38.213 [6]; or 2> if the PDCCH indicates a retransmission of HARQ feedback as specified in clause 9.1.5 of TS 38.213 [6]:

3> start or restart the drx-HARQ-RTT-TimerDL for the corresponding HARQ process(es) whose HARQ feedback is reported in the first symbol after the end of the corresponding transmission carrying the DL HARQ feedback;

NOTE 3: When HARQ feedback is postponed by PDSCH-to-HARQ_feedback timing indicating an inapplicable kl value, as specified in TS 38.213 [6], the corresponding transmission opportunity to send the DL HARQ feedback is indicated in a later PDCCH requesting the HARQ-ACK feedback.

3> stop the drx-RetransmissionTimerDL for the corresponding HARQ process(es) whose HARQ feedback is reported.

3> if the PDSCH-to-HARQ_feedback timing indicate an inapplicable kl value as specified in TS 38.213 [6]:

4> start the drx-RetransmissionTimerDL in the first symbol after the (end of the last) PDSCH transmission (within a bundle) for the corresponding HARQ process.

2> if the PDCCH indicates a UL transmission:

3> if this Serving Cell is not configured with uplinkHARQ-Mode; or

3> if this Serving Cell is configured with uplinkHARQ-Mode and the corresponding HARQ process is configured as HARQ Mode A:

4> start the drx-HARQ-RTT-TimerUL for the corresponding HARQ process in the first symbol after the end of the first transmission (within a bundle) of the corresponding PUSCH transmission;

3> stop the drx-RetransmissionTimerUL for the corresponding HARQ process.

2> if the PDCCH indicates an SL transmission:

3> if the PUCCH resource is configured:

4> start the drx-HARQ-RTT-TimerSL for the corresponding HARQ process in the first symbol after the end of the corresponding PUCCH transmission carrying the SL HARQ feedback; or 4> start the drx-HARQ-RTT-TimerSL for the corresponding HARQ process in the first symbol after the end of the corresponding PUCCH resource for the SL HARQ feedback when the PUCCH is not transmitted due to UL/SL prioritization;

4> stop the drx-RetransmissionTimerSL for the corresponding HARQ process.

3> else:

4> start the drx-HARQ-RTT-TimerSL for the corresponding HARQ process at the first symbol after end of PDCCH occasion;

4> stop the drx-RetransmissionTimerSL for the corresponding HARQ process.

2> if the PDCCH indicates a new transmission (DL, UL or SL) on a Serving Cell in this DRX group:

3> start or restart drx-InactivityTimer for this DRX group in the first symbol after the end of the PDCCH reception.

NOTE 3a: A PDCCH indicating activation of SPS, configured grant type 2, or configured sidelink grant of configured grant Type 2 is considered to indicate a new transmission.

NOTE 3b: If the PDCCH reception includes two PDCCH candidates from corresponding search spaces, as described in clause 10.1 in 38.213, start or restart drx-InactivityTimer for this DRX group in the first symbol after the end of the PDCCH candidate that ends later in time.

2> if a HARQ process receives downlink feedback information and acknowledgement is indicated:

3> stop the drx-RetransmissionTimerUL for the corresponding HARQ process.

1> if DCP monitoring is configured for the active DL BWP as specified in TS 38.213 [6], clause 10.3; and 1> if the current symbol n occurs within drx-onDurationTimer duration; and 1> if drx-onDurationTimer associated with the current DRX cycle is not started as specified in this clause:

2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:

3> not transmit periodic SRS and semi-persistent SRS defined in TS 38.214 [7];

3> not report semi-persistent CSI configured on PUSCH;

3> if ps-TransmitPeriodicL1-RSRP is not configured with value true:

4> not report periodic CSI that is L1-RSRP on PUCCH.

3> if ps-TransmitOtherPeriodicCSI is not configured with value true:

4> not report periodic CSI that is not L1-RSRP on PUCCH.

1> else:

2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause; and 2> if allowCSI-SRS-Tx-MulticastDRX-Active is not configured or, in current symbol n, if all multicast DRX would not be in Active Time considering multicast assignments and DRX Command MAC CE for MBS multicast received until 4 ms prior to symbol n when evaluating all DRX Active Time conditions as specified in Clause 5.7b:

3> not transmit periodic SRS and semi-persistent SRS defined in TS 38.214 [7] in this DRX group;

3> not report CSI on PUCCH and semi-persistent CSI configured on PUSCH in this DRX group.

2> if CSI masking (csi-Mask) is setup by upper layers:

3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and 4> not report CSI on PUCCH in this DRX group.

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource either outside DRX Active Time of the DRX group in which this PUCCH is configured or outside the on-duration period of the DRX group in which this PUCCH is configured if CSI masking is setup by upper layers, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

5.14 Handling of Measurement Gaps

During an activated measurement gap, the MAC entity shall, on the Serving Cell(s) in the corresponding frequency range of the measurement gap configured by measGapConfig as specified in TS 38.331 [5]:

1> not perform the transmission of HARQ feedback, SR, and CSI;

1> not report SRS;

1> not transmit on UL-SCH except for Msg3 or the MSGA payload as specified in clause 5.4.2.2;

1> if the ra-Response Window or the ra-ContentionResolutionTimer or the msgB-ResponseWindow is running 2> monitor the PDCCH as specified in clauses 5.1.4 and 5.1.5.

1> else:

2> not monitor the PDCCH;

2> not receive on DL-SCH.

5.21 LBT Operation 5.21.1 General

The lower layer may perform an LBT procedure, see TS 37.213 [18], according to which a transmission is not performed by lower layers if the channel is identified as being occupied. When lower layer performs an LBT procedure before a transmission and the transmission is not performed, an LBT failure indication is sent to the MAC entity from lower layers. Unless otherwise specified, when LBT procedure is performed for a transmission, actions as specified in this specification are performed regardless of if an LBT failure indication is received from lower layers. When LBT is not performed by the lower layers, LBT failure indication is not received from lower layers.

5.21.2 LBT Failure Detection and Recovery Procedure

The MAC entity may be configured by RRC with a consistent LBT failure recovery procedure. Consistent LBT failure is detected per UL BWP by counting LBT failure indications, for all UL transmissions, from the lower layers to the MAC entity.

RRC configures the following parameters in the lbt-FailureRecoveryConfig:

lbt-FailureInstanceMaxCount for the consistent LBT failure detection;

lbt-FailureDetectionTimer for the consistent LBT failure detection;

The following UE variable is used for the consistent LBT failure detection procedure:

LBT_COUNTER (per Serving Cell): counter for LBT failure indication which is initially set to 0.

For each activated Serving Cell configured with lbt-FailureRecoveryConfig, the MAC entity shall:

1> if LBT failure indication has been received from lower layers:

2> start or restart the lbt-FailureDetectionTimer;

2> increment LBT_COUNTER by 1;

2> if LBT_COUNTER>=lbt-FailureInstanceMaxCount:

3> trigger consistent LBT failure for the active UL BWP in this Serving Cell;

3> if this Serving Cell is the SpCell:

4> if consistent LBT failure has been triggered in all UL BWPs configured with PRACH occasions on same carrier in this Serving Cell:

5> indicate consistent LBT failure to upper layers.

4> else:

5> stop any ongoing Random Access procedure in this Serving Cell;

5> switch the active UL BWP to a UL BWP, on same carrier in this Serving Cell, configured with PRACH occasion and for which consistent LBT failure has not been triggered;

5> initiate a Random Access Procedure (as specified in clause 5.1.1).

1> if all triggered consistent LBT failures are cancelled in this Serving Cell; or 1> if the lbt-FailureDetectionTimer expires; or 1> if lbt-FailureDetectionTimer or lbt-FailureInstanceMaxCount is reconfigured by upper layers:

2> set LBT_COUNTER to 0.

The MAC entity shall:

1> if consistent LBT failure has been triggered, and not cancelled, in the SpCell; and 1> if UL-SCH resources are available for a new transmission in the SpCell and these UL-SCH resources can accommodate the LBT failure MAC CE plus its subheader as a result of logical channel prioritization:

2> instruct the Multiplexing and Assembly procedure to generate the LBT failure MAC CE.

1> else if consistent LBT failure has been triggered, and not cancelled, in at least one SCell:

2> if UL-SCH resources are available for a new transmission in a Serving Cell for which consistent LBT failure has not been triggered and these UL-SCH resources can accommodate the LBT failure MAC CE plus its subheader as a result of logical channel prioritization:

3> instruct the Multiplexing and Assembly procedure to generate the LBT failure MAC CE.

2> else:

3> trigger a Scheduling Request for LBT failure MAC CE.

1> if a MAC PDU is transmitted and LBT failure indication is not received from lower layers and this PDU includes the LBT failure MAC CE:

2> cancel all the triggered consistent LBT failure(s) in SCell(s) for which consistent LBT failure was indicated in the transmitted LBT failure MAC CE.

1> if consistent LBT failure is triggered and not cancelled in the SpCell; and

1> if the Random Access procedure is considered successfully completed (see clause 5.1) in the SpCell:

2> cancel all the triggered consistent LBT failure(s) in the SpCell.

1> if lbt-FailureRecoveryConfig is reconfigured by upper layers for a Serving Cell:

2> cancel all the triggered consistent LBT failure(s) in this Serving Cell.

5.22.1.3.2 PSFCH Reception

The MAC entity shall for each PSSCH transmission:

1> if an acknowledgement corresponding to the PSSCH transmission in clause 5.22.1.3.1a is obtained from the physical layer:

2> deliver the acknowledgement to the corresponding Sidelink HARQ entity for the Sidelink process;

1> else:

2> deliver a negative acknowledgement to the corresponding Sidelink HARQ entity for the Sidelink process;

1> if the PSSCH transmission occurs for a pair of Source Layer-2 ID and Destination Layer-2 ID corresponding to a PC5-RRC connection which has been established by upper layers:

2> perform the HARQ-Based Sidelink RLF Detection procedure as specified in clause 5.22.1.3.3.

If sl-PUCCH-Config is configured by RRC, the MAC entity shall for a PUCCH transmission occasion:

1> if the timeAlignmentTimer, associated with the TAG containing the Serving Cell on which the HARQ feedback is to be transmitted, is stopped or expired:

2> not instruct the physical layer to generate acknowledgement(s) of the data in this TB.

1> else if a MAC PDU has been obtained for a sidelink grant associated to the PUCCH transmission occasion in clause 5.22.1.3.1, the MAC entity shall:

2> if the most recent transmission of the MAC PDU was not prioritized as specified in clause 5.22.1.3.1a:

3> instruct the physical layer to signal a negative acknowledgement on the PUCCH according to clause 16.5 of TS 38.213 [6].

2> else if HARQ feedback has been disabled for the MAC PDU and next retransmission(s) of the MAC PDU is not required; or 2> else if all PSCCH duration(s) and PSSCH duration(s) for initial transmission of a MAC PDU of the dynamic sidelink grant or the configured sidelink grant is not in SL DRX Active time as specified in clause 5.28.1 of the destination that has data to be sent:

3> instruct the physical layer to signal a positive acknowledgement corresponding to the transmission on the PUCCH according to clause 16.5 of TS 38.213 [6].

2> else if HARQ feedback has been disabled for the MAC PDU, and no sidelink grant is available for next retransmission(s) of the MAC PDU (including immediately after all PSSCH duration(s) in an sl-PeriodCG for the sidelink grant, the number of transmissions of the MAC PDU has not reached sl-MaxTransNum corresponding to the highest priority of the logical channel(s) in the MAC PDU, if configured in sl-CG-MaxTransNumList for the sidelink grant by RRC), if any; or 2> else if PSCCH duration(s) and PSSCH duration(s) for one or more retransmissions of a MAC PDU of the dynamic sidelink grant or the configured sidelink grant is not in SL DRX Active time as specified in clause 5.28.1 of the destination that has data to be sent:

3> instruct the physical layer to signal a negative acknowledgement corresponding to the transmission on the PUCCH according to clause 16.5 of TS 38.213 [6].

2> else:

3> instruct the physical layer to signal an acknowledgement corresponding to the transmission on the PUCCH according to clause 16.5 of TS 38.213 [6]

1> else:

2> instruct the physical layer to signal a positive acknowledgement on the PUCCH according to clause 16.5 of TS 38.213 [6].

5.22.1.3.1a Sidelink Process

[ . . . ]

The transmission of the MAC PDU is prioritized over uplink transmission(s) of the MAC entity or the other MAC entity if the following conditions are met:

1> if the MAC entity is not able to perform this sidelink transmission simultaneously with all uplink transmission(s) at the time of the transmission, and 1> if none of the uplink transmission(s) is prioritized by upper layer according to TS 23.287 [19], and 1> if none of the NR uplink MAC PDU(s) includes any MAC CE prioritized as described in clause 5.4.3.1.3, and 1> if ul-PrioritizationThres is configured and if the value of the highest priority of logical channel(s) of all the NR uplink transmission(s) is not lower than ul-PrioritizationThres, and 1> if sl-PrioritizationThres is configured and if the value of the highest priority of logical channel(s) or a MAC CE in the MAC PDU is lower than sl-PrioritizationThres.

NOTE 2: If the MAC entity is not able to perform this sidelink transmission simultaneously with all uplink transmissions as specified in clause 5.4.2.2 of TS 36.321 [22] at the time of the transmission, and prioritization-related information is not available prior to the time of this sidelink transmission due to processing time restriction, it is up to UE implementation whether this sidelink transmission is performed.

In the 3GPP speciation ([2] 3GPP 38.331 v17.0.0), SL, SL PUCCH configuration, and DRX configuration are introduced:

DRX-ConfigSL

The IE DRX-ConfigSL is used to configure additional DRX parameters for the UE performing sidelink operation with resource allocation mode 1, as specified in TS 38.321 [3].

DRX-ConfigSL Information Element

```
DRX-ConfigSL ::=            SEQUENCE {
  drx-HARQ-RTT-TimerSL        INTEGER (0 .. 56),
  drx-RetransmissionTimerSL     ENUMERATED {s10, s11, s12, s14, s16, s18, s116, s124, s133, s140,
s164, s180, s196, s1112, s1128, s1160,
                                  s1320, spare15, spare14, spare13, spare12, spare11,
spare10, spare9, spare8, spare7, spare6,
                                  spare5, spare4, spare3, spare2, spare1}
}
```

| DRX-ConfigSL field descriptions |
| --- |
| drx-HARQ-RTT-TimerSL<br>Value in number of symbols of the BWP where the PDCCH was transmitted. |
| drx-Retransmission TimerSL<br>Value in number of slot lengths of the BWP where the PDCCH was transmitted. sl0 corresponds to 0 slots, sl1 corresponds to 1 slot, sl2 corresponds to 2 slots, and so on. |

SL-ConfigDedicatedNR

The IE SL-ConfigDedicatedNR specifies the dedicated configuration information for NR sidelink communication.

SL-ConfigDedicatedNR Information Element

```
SL-ConfigDedicatedNR-r16 ::=            SEQUENCE {
  sl-PHY-MAC-RLC-Config-r16               SL-PHY-MAC-RLC-Config-r16
OPTIONAL,   -- Need M
  sl-RadioBearerToReleaseList-r16         SEQUENCE (SIZE (1..maxNrofSLRB-r16)) OF SLRB-Uu-ConfigIndex-
r16   OPTIONAL,   -- Need N
  sl-RadioBearerToAddModList-r16          SEQUENCE (SIZE (1..maxNrofSLRB-r16)) OF SL-
RadioBearerConfig-r16   OPTIONAL,   -- Need N
  sl-MeasConfigInfoToReleaseList-r16      SEQUENCE (SIZE (1..maxNrofSL-Dest-r16)) OF SL-
DestinationIndex-r16   OPTIONAL,   -- Need N
  sl-MeasConfigInfoToAddModList-r16       SEQUENCE (SIZE (1..maxNrofSL-Dest-r16)) OF SL-
MeasConfigInfo-r16   OPTIONAL,   -- Need N
  t400-r16                                ENUMERATED {ms100, ms200, ms300, ms400, ms600, ms1000,
ms1500, ms2000} OPTIONAL,   -- Need M
  ...,
  [[
  sl-PHY-MAC-RLC-Config-v1700             SL-PHY-MAC-RLC-Config-v1700
OPTIONAL,   -- Need M
  sl-DiscConfig-r17                       SetupRelease { SL-DiscConfig-r17}
OPTIONAL,   -- Need M
  sl-RLC-ChannelToReleaseList-r17         SEQUENCE (SIZE (1..maxSL-LCID-r16)) OF SL-RLC-ChannelID-r17
OPTIONAL, -- Cond L2U2N
  sl-RLC-ChannelToAddModList-r17          SEQUENCE (SIZE (1..maxSL-LCID-r16)) OF SL-RLC-ChannelConfig-
r17   OPTIONAL -- Cond L2U2N
  ]]
}
SL-DestinationIndex-r16 ::=               INTEGER (0..maxNrofSL-Dest-1-r16)
SL-PHY-MAC-RLC-Config-r16::=            SEQUENCE {
  sl-ScheduledConfig-r16                  SetupRelease { SL-ScheduledConfig-r16 }
OPTIONAL,   -- Need M
  sl-UE-SelectedConfig-r16                SetupRelease { SL-UE-SelectedConfig-r16 }
OPTIONAL,   -- Need M
  sl-FreqInfoToReleaseList-r16            SEQUENCE (SIZE (1..maxNrofFreqSL-r16)) OF SL-Freq-Id-r16
OPTIONAL,   -- Need N
  sl-FreqInfoToAddModList-r16             SEQUENCE (SIZE (1..maxNrofFreqSL-r16)) OF SL-FreqConfig-r16
OPTIONAL,   -- Need N
  sl-RLC-BearerToReleaseList-r16          SEQUENCE (SIZE (1..maxSL-LCID-r16)) OF SL-RLC-
BearerConfigIndex-r16   OPTIONAL,   -- Need N
  sl-RLC-BearerToAddModList-r16           SEQUENCE (SIZE (1..maxSL-LCID-r16)) OF SL-RLC-BearerConfig-
r16   OPTIONAL,   -- Need N
  sl-MaxNumConsecutiveDTX-r16             ENUMERATED {n1, n2, n3, n4, n6, n8, n16, n32}
OPTIONAL,   -- Need M
  sl-CSI-Acquisition-r16                  ENUMERATED {enabled}
OPTIONAL,   -- Need R
  sl-CSI-SchedulingRequestId-r16          SetupRelease {SchedulingRequestId}
```

-continued

```
OPTIONAL,    -- Need M
   sl-SSB-PriorityNR-r16                INTEGER (1..8)
OPTIONAL,    -- Need R
   networkControlledSyncTx-r16          ENUMERATED {on, off}
OPTIONAL    -- Need M
}
SL-PHY-MAC-RLC-Config-v1700 ::=      SEQUENCE {
   sl-DRX-Config-r17                    SetupRelease { SL-DRX-Config-r17 }
OPTIONAL,    -- Need M
   ...
}
SL-DiscConfig-r17::=                 SEQUENCE {
   sl-RelayUE-Config-r17                SetupRelease { SL-RelayUE-Config-r17}
OPTIONAL, -- L2RelayUE
   sl-RemoteUE-Config-r17               SetupRelease { SL-RemoteUE-Config-r17}
OPTIONAL -- L2RemoteUE
}
```

| SL-ConfigDedicatedNR field descriptions |
|---|
| sl-MeasConfigInfoToAddModList<br>This field indicates the RSRP measurement configurations for unicast destinations to add and/or modify. |
| sl-MeasConfigInfoToReleaseList<br>This field indicates the RSRP measurement configurations for unicast destinations to remove. |
| sl-PHY-MAC-RLC-Config<br>This field indicates the lower layer sidelink radio bearer configurations. |
| sl-RadioBearerToAddModList<br>This field indicates one or multiple sidelink radio bearer configurations to add and/or modify. This field is not configured to the PC5 connection used for L2 U2N relay operation. |
| sl-RadioBearerToReleaseList<br>This field indicates one or multiple sidelink radio bearer configurations to remove. This field is not configured to the PC5 connection used for L2 U2N relay operation. |

| Conditional Presence | Explanation |
|---|---|
| L2RelayUE | For L2 U2N Relay UE, the field is optionally present, Need M. Otherwise, it is absent. |
| L2RemoteUE | For L2 U2N Remote UE, the field is optionally present, Need M. Otherwise, it is absent. |
| L2U2N | The field is optional present for L2 U2N Relay UE and L2 U2N Remote UE, need M. Otherwise, it is absent. |

MeasGapConfig

The IE MeasGapConfig specifies the measurement gap configuration and controls setup/release of measurement gaps.

| SL-PHY-MAC-RLC-Config field descriptions |
|---|
| networkControlledSyncTx<br>This field indicates whether the UE shall transmit synchronisation information (i.e. become synchronisation source). Value on indicates the UE to transmit synchronisation information while value off indicates the UE to not transmit such information. |
| sl-DRX-Config<br>This field indicates the sidelink DRX configuration(s) for unicast, groupcast and/or broadcast communication, as specified in TS 38.321 [3]. |
| sl-MaxNumConsecutiveDTX<br>This field indicates the maximum number of consecutive HARQ DTX before triggering sidelink RLF. Value n1 corresponds to 1, value n2 corresponds to 2, and so on. |
| sl-FreqinfoToAddModList<br>This field indicates the NR sidelink communication configuration on some carrier frequency (ies) to add and/or modify. In this release, only one entry can be configured in the list. |
| sl-FreqInfoToReleaseList<br>This field indicates the NR sidelink communication configuration on some carrier frequency (ies) to remove. In this release, only one entry can be configured in the list. |
| sl-RLC-BearerToAddModList<br>This field indicates one or multiple sidelink RLC bearer configurations to add and/or modify. |
| sl-RLC-BearerToReleaseList<br>This field indicates one or multiple sidelink RLC bearer configurations to remove. |
| sl-ScheduledConfig<br>Indicates the configuration for UE to transmit NR sidelink communication based on network scheduling. This field is not configured simultaneously with sl-UE-SelectedConfig. This field is not configured to a L2 U2N Remote UE. |
| sl-UE-SelectedConfig<br>Indicates the configuration used for UE autonomous resource selection. This field is not configured simultaneously with sl-ScheduledConfig. |
| sl-CSI-Acquisition<br>Indicates whether CSI reporting is enabled in sidelink unicast. If the field is absent, sidelink CSI reporting is disabled. |
| sl-CSI-SchedulingRequestId<br>If present, it indicates the scheduling request configuration applicable for sidelink CSI report MAC CE, as specified in TS 38.321 [3]. |
| sl-SSB-PriorityNR<br>This field indicates the priority of NR sidelink SSB transmission and reception. |

MeasGapConfig Information Element

```
MeasGapConfig ::=                    SEQUENCE {
   gapFR2                               SetupRelease { GapConfig }
OPTIONAL,   -- Need M
   ...,
   [[
   gapFR1                               SetupRelease { GapConfig }
OPTIONAL,   -- Need M
   gapUE                                SetupRelease { GapConfig }
OPTIONAL    -- Need M
   ]],
   [[
   gapUEToAddModList-r17             SEQUENCE (SIZE (1..maxNrofGapId-1-r17)) OF GapConfig
OPTIONAL,   -- Need N
   gapUEToReleaseList-r17            SEQUENCE (SIZE (1..maxNrofGapId-1-r17)) OF MeasGapId-r17
OPTIONAL,   -- Need N
   gapFR1ToAddModList-r17            SEQUENCE (SIZE (1..maxNrofGapId-1-r17)) OF GapConfig
OPTIONAL,   -- Need N
   gapFR1ToReleaseList-r17           SEQUENCE (SIZE (1..maxNrofGapId-1-r17)) OF MeasGapId-r17
OPTIONAL,   -- Need N
   gapFR2ToAddModList-r17            SEQUENCE (SIZE (1..maxNrofGapId-1-r17)) OF GapConfig
OPTIONAL,   -- Need N
   gapFR2ToReleaseList-r17           SEQUENCE (SIZE (1..maxNrofGapId-1-r17)) OF MeasGapId-r17
OPTIONAL    -- Need N
   ]]
}
GapConfig ::=                        SEQUENCE {
   gapOffset                            INTEGER (0..159),
   mgl                                  ENUMERATED {ms1dot5, ms3, ms3dot5, ms4, ms5dot5, ms6},
   mgrp                                 ENUMERATED {ms20, ms40, ms80, ms160},
   mgta                                 ENUMERATED {ms0, ms0dot25, ms0dot5},
   ...,
    [[
   refServCellIndicator                 ENUMERATED {pCell, pSCell, mcg-FR2}
OPTIONAL    -- Cond NEDCorNRDC
   ]],
   [[
   refFR2ServCellAsyncCA-r16            ServCellIndex
OPTIONAL,   -- Cond AsyncCA
   mgl-r16                              ENUMERATED {ms10, ms20}
OPTIONAL    -- Cond PRS
   ]],
   [[
   measGapId-r17                        MeasGapId-r17
OPTIONAL,   -- Cond GapID
   preConfigInd-r17                     ENUMERATED {true}
OPTIONAL,   -- Need R
   nscgInd-r17                          ENUMERATED {true}
OPTIONAL,   -- Need R
   mgta-r17                             ENUMERATED {ms0dot75}
OPTIONAL,   -- Need R
   mgl-r17                              ENUMERATED {ms1, ms2, ms5}
OPTIONAL,   -- Need R
   gapAssociationPRS-r17                ENUMERATED {true}
OPTIONAL,   -- Need R
   gapSharing-r17                       MeasGapSharingScheme
OPTIONAL,   -- Need R
   gapPriority-r17                      GapPriority-r17
OPTIONAL    -- Need R
   ]]
}
```

| MeasGapConfig field descriptions |
| --- |
| gapAssociationPRS<br>Indicates that PRS measurement is associated with this measurement gap. The network only includes this field for one per UE gap. |
| gapFR1<br>Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE unless concurrent MGs are supported. The applicability of the FR1 measurement gap is according to Table 9.1.2-2 and Table 9.1.2-3 in TS 38.133 [14]. |
| gapFR1ToAddModList |

-continued

| MeasGapConfig field descriptions |
|---|
| A list of of FR1 measurement gap configuartion to be added or modified. In this version of the specification, the network configures this field only in NR standalone.<br>gapFR1ToReleaseList<br>A list of FR1 measurement gap configuartion to be released.<br>gapFR2<br>Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE unless concurrent MGs are supported. The applicability of the FR2 measurement gap is according to Table 9.1.2-2 and Table 9.1.2-3 in TS 38.133 [14].<br>gapFR2ToAddModList<br>A list of FR2 measurement gap configuration to be added or modified. In this version of the specification, the network configures this field only in NR standalone.<br>gapFR2ToReleaseList<br>A list of FR2 measurement gap configuration to be released.<br>gapPriority<br>Indicates the priority of this measurement gap (see TS 38.133 [14], clause FFS). Value 1 indicates highest priority, value 2 indicates second level priority, and so on.<br>gapSharing<br>Indicates the measurement gap sharing scheme that applies to this GapConfig. For applicability of the different gap sharing schemes, see TS 38.133 [14]. Value scheme00 corresponds to scheme "00", value scheme01 corresponds to scheme "01", and so on. The network does not include this field if this GapConfig is configured by gapFR1, gapFR2, or gapUE.<br>gapAssociationPRS<br>Indicates that PRS measurement is associated with this measurement gap. The network only includes this field for one per UE gap.<br>gapUE<br>Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In NR-DC, gapUE can only be set up in the measConfig associated with MCG. The per UE measurement gap is configured with other FR1 gap and/or FR2 gap simultaneously only while this per UE gap is associated with PRS measurement. The applicability of the per UE measurement gap is according to Table 9.1.2-2 and Table 9.1.2-3 in TS 38.133 [14].<br>gapUEToAddModList<br>A list of per UE measurement gap configuartion to be added or modified. A per UE measurement gap can be configured with other FR1 gap and/or FR2 gap simultaneously only while this per UE gap is associated with PRS measurement. In this version of the specification, the network configures this field only in NR standalone.<br>gapUEToReleaseList<br>A list of per UE measurement gap configuartion to be released.<br>gapOffset<br>Value gapOffset is the gap offset of the gap pattern with MGRP indicated in the field mgrp. The value range is from 0 to mgrp-1. If nscglnd-r17 is present, this offset value refers to the starting point of VIL1 (the visible interruption length before the ML).<br>measGapId<br>The ID of this measurement gap configuration.<br>mgl<br>Value mg/ is the measurement gap length in ms of the measurement gap. If nscglnd-r17 is not present, the measurement gap length is according to in Table 9.1.2-1 in TS 38.133 [14]. If nscglnd-r17 is present, this field indicates the measurement length (ML) in NCSG pattern and is configured according to Table 9.1.2C-1 in TS 38.133 [14]. Value ms1dot5 corresponds to 1.5 ms, ms3 corresponds to 3 ms and so on. If mgl-r16 or mgl-r17 is present, UE shall ignore the mgl (without suffix).<br>mgrp<br>Value mgrp is measurement gap repetition period in (ms) of the measurement gap. The measurement gap repetition period is according to Table 9.1.2-1 in TS 38.133 [14].<br>gapAssociationPRS<br>Indicates that PRS measurement is associated with this measurement gap. The network only includes this field for one per UE gap.<br>mgta<br>Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms. If mgta-r17 is present, UE shall ignore the mgta (without suffix).<br>nscgInd<br>Indicates that the measurement gap is a NCSG as specified in 38.133 [14].<br>preConfigInd<br>Indicates whether the measurement gap is a pre-configured measurement gap.<br>refFR2ServCellAsyncCA<br>Indicates the FR2 serving cell identifier whose SFN and subframe is used for FR2 gap calculation for this gap pattern with asynchronous CA involving FR2 carrier(s).<br>refServCellIndicator<br>Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG. |

BWP-UplinkDedicated

The IE BWP-UplinkDedicated is used to configure the dedicated (UE specific) parameters of an uplink BWP.

BWP-UplinkDedicated Information Element

```
BWP-UplinkDedicated ::=        SEQUENCE {
    pucch-Config                   SetupRelease { PUCCH-Config }
OPTIONAL,       -- Need M
  ...
    sl-PUCCH-Config-r16            SetupRelease { PUCCH-Config }
OPTIONAL,       --Need M
}
```

| BWP-UplinkDedicated field descriptions |
|---|
| pucch-Config<br>PUCCH configuration for one BWP of the normal UL or SUL of a serving cell. If the UE is configured with SUL, the network configures PUCCH only on the BWPs of one of the uplinks (normal UL or SUL). The network configures PUCCH-Config at least on non-initial BWP(s) for SpCell and PUCCH SCell. If supported by the UE, the network may configure at most one additional SCell of a cell group with PUCCH-Config (i.e. PUCCH SCell); if PUCCH cell switching is supported by the UE, the network may configure at most one additional SCell with PUCCH-Config within each PUCCH group.<br>In (NG)EN-DC and NE-DC, the NW configures at most one serving cell per frequency range with PUCCH. In (NG)EN-DC and NE-DC, if two PUCCH groups are configured, the serving cells of the NR PUCCH group in FR2 use the same numerology. For NR-DC, the maximum number of PUCCH groups in each cell group is one, and only the same numerology is supported for the cell group with carriers only in FR2.<br>The NW may configure PUCCH for a BWP when setting up the BWP. The network may also add/remove the pucch-Config in an RRCReconfiguration with reconfigurationWithSync (for SpCell or PUCCH SCell) or with SCell release and add (for PUCCH SCell) to move the PUCCH between the UL and SUL carrier of one serving cell. In other cases, only modifications of a previously configured pucch-Config are allowed.<br>If one (S)UL BWP of a serving cell is configured with PUCCH, all other (S)UL BWPs must be configured with PUCCH, too. |
| pucch-ConfigurationList<br>PUCCH configurations for two simultaneously constructed HARQ-ACK codebooks (see TS 38.213 [13], clause 9.1). Different PUCCH Resource IDs are configured in different PUCCH-Config within the pucch-ConfigurationList if configured. |
| pucch-ConfigurationListMulticast1<br>PUCCH configurations for two simultaneously constructed HARQ-ACK codebooks for MBS multicast (see TS 38.213, clause 9). |
| pucch-ConfigurationListMulticast2<br>PUCCH configurations for two simultaneously constructed NACK-only feedback for MBS multicast (see TS 38.213, clause 9). |
| pusch-Config<br>PUSCH configuration for one BWP of the normal UL or SUL of a serving cell. If the UE is configured with SUL and if it has a PUSCH-Config for both UL and SUL, an UL/SUL indicator field in DCI indicates which of the two to use. See TS 38.212 [17], clause 7.3.1. |
| sl-PUCCH-Config<br>Indicates the UE specific PUCCH configurations used for the HARQ-ACK feedback reporting for NR sidelink communication. |

PUCCH-Config

The IE PUCCH-Config is used to configure UE specific PUCCH parameters (per BWP).

PUCCH-Config Information Element

```
PUCCH-Config ::=                   SEQUENCE {
  resourceSetToAddModList               SEQUENCE (SIZE (1..maxNrofPUCCH-ResourceSets)) OF PUCCH-
ResourceSet   OPTIONAL, -- Need N
  resourceSetToReleaseList              SEQUENCE (SIZE (1..maxNrofPUCCH-ResourceSets)) OF PUCCH-
ResourceSetId OPTIONAL, -- Need N
  resourceToAddModList                  SEQUENCE (SIZE (1..maxNrofPUCCH-Resources)) OF PUCCH-
Resource      OPTIONAL, -- Need N
  resourceToReleaseList                 SEQUENCE (SIZE (1..maxNrofPUCCH-Resources)) OF PUCCH-
ResourceId    OPTIONAL, -- Need N
  format1                               SetupRelease { PUCCH-FormatConfig }
OPTIONAL, -- Need M
  format2                               SetupRelease { PUCCH-FormatConfig }
```

-continued

```
OPTIONAL, -- Need M
  format3                              SetupRelease { PUCCH-FormatConfig }
OPTIONAL, -- Need M
  format4                              SetupRelease { PUCCH-FormatConfig }
OPTIONAL, -- Need M
  schedulingRequestResourceToAddModList    SEQUENCE (SIZE (1..maxNrofSR-Resources)) OF
SchedulingRequestResourceConfig
OPTIONAL, -- Need N
  schedulingRequestResourceToReleaseList   SEQUENCE (SIZE (1..maxNrofSR-Resources)) OF
SchedulingRequestResourceId
OPTIONAL, -- Need N
  multi-CSI-PUCCH-ResourceList         SEQUENCE (SIZE (1..2)) OF PUCCH-ResourceId
OPTIONAL, -- Need M
  dl-DataToUL-ACK                      SEQUENCE (SIZE (1..8)) OF INTEGER (0..15)
OPTIONAL, -- Need M
  spatialRelationInfoToAddModList      SEQUENCE (SIZE (1..maxNrofSpatialRelationInfos)) OF
PUCCH-SpatialRelationInfo
OPTIONAL, -- Need N
  spatialRelationInfoToReleaseList     SEQUENCE (SIZE (1..maxNrofSpatialRelationInfos)) OF
PUCCH-SpatialRelationInfoId
OPTIONAL, -- Need N
  pucch-PowerControl                   PUCCH-PowerControl
OPTIONAL, -- Need M
  ...,
  [[
  resourceToAddModListExt-v1610        SEQUENCE (SIZE (1..maxNrofPUCCH-Resources)) OF PUCCH-
ResourceExt-v1610 OPTIONAL, -- Need N
  dl-DataToUL-ACK-r16                  SetupRelease { DL-DataToUL-ACK-r16 }
OPTIONAL, -- Need M
  ul-AccessConfigListDCI-1-1-r16       SetupRelease { UL-AccessConfigListDCI-1-1-r16 }
OPTIONAL, -- Need M
  subslotLengthForPUCCH-r16            CHOICE {
      normalCP-r16                             ENUMERATED {n2,n7},
      extendedCP-r16                           ENUMERATED {n2,n6}
  }
OPTIONAL, -- Need R
  dl-DataToUL-ACK-DCI-1-2-r16          SetupRelease { DL-DataToUL-ACK-DCI-1-2-r16}
OPTIONAL, -- Need M
  numberOfBitsForPUCCH-ResourceIndicatorDCI-1-2-r16 Integer (0..3)
OPTIONAL, -- Need R
  dmrs-UplinkTransformPrecodingPUCCH-r16 ENUMERATED {enabled}
OPTIONAL, -- Cond PI2-BPSK
  spatialRelationInfoToAddModListSizeExt-v1610                SEQUENCE (SIZE
(1..maxNrofSpatialRelationInfosDiff-r16)) OF PUCCH-SpatialRelationInfo
OPTIONAL, -- Need N
  spatialRelationInfoToReleaseListListSizeExt-v1610           SEQUENCE (SIZE
(1..maxNrofSpatialRelationInfosDiff-r16)) OF PUCCH-SpatialRelationInfoID
OPTIONAL, -- Need N
  spatialRelationInfoToAddModListExt-v1610 SEQUENCE (SIZE (1..maxNrofSpatialRelationInfos-r16)) OF
PUCCH-SpatialRelationInfoExt-r16
OPTIONAL, -- Need N
  spatialRelationInfoToReleaseListExt-v1610 SEQUENCE (SIZE (1..maxNrofSpatialRelationInfos-r16))
OF
SpatialRelationInfoId-r16    OPTIONAL, -- Need N
  resourceGroupToAddModList-r16        SEQUENCE (SIZE (1..maxNrofPUCCH-ResourceGroups-r16)) OF
PUCCH-ResourceGroup-r16
OPTIONAL, -- Need N
  resourceGroupToReleaseList-r16       SEQUENCE (SIZE (1..maxNrofPUCCH-ResourceGroups-r16)) OF
PUCCH-ResourceGroupId-r16
OPTIONAL, -- Need N
  sps-PUCCH-AN-List-r16                SetupRelease { SPS-PUCCH-AN-List-r16 }
OPTIONAL, -- Need M
  schedulingRequestResourceToAddModListExt-v1610    SEQUENCE (SIZE (1..maxNrofSR-Resources)) OF
SchedulingRequestResourceConfigExt-v1610
OPTIONAL -- Need N
  ]],
  [[
  format0-r17                          SetupRelease { PUCCH-FormatConfig }
OPTIONAL, -- Need M
  format2Ext-r17                       SetupRelease { PUCCH-FormatConfigExt-r17 }
OPTIONAL, -- Need M
  format3Ext-r17                       SetupRelease { PUCCH-FormatConfigExt-r17 }
OPTIONAL, -- Need M
  format4Ext-r17                       SetupRelease { PUCCH-FormatConfigExt-r17 }
OPTIONAL, -- Need M
  ul-AccessConfigListDCI-1-2-r17       SetupRelease { UL-AccessConfigListDCI-1-2-r17 }
OPTIONAL, -- Need M
  mappingPattern-r17                   ENUMERATED {cyclicMapping, sequentialMapping}
```

```
OPTIONAL, -- Need R
  powerControlSetInfoToAddModList-r17       SEQUENCE (SIZE (1..maxNrofPowerControlSetInfos-r17)) OF
PUCCH-PowerControlSetInfo-r17
OPTIONAL, -- Need N
  powerControlSetInfoToReleaseList-r17      SEQUENCE (SIZE (1..maxNrofPowerControlSetInfos-r17)) OF
PUCCH-PowerControlSetInfoId-r17
OPTIONAL, -- Need N
  secondTPCFieldDCI-1-1-r17                 ENUMERATED {enabled}
OPTIONAL, -- Need R
  secondTPCFieldDCI-1-2-r17                 ENUMERATED {enabled}
OPTIONAL, -- Need R
  dl-DataToUL-ACK-r17                       SetupRelease { DL-DataToUL-ACK-r17 }
OPTIONAL, -- Need M
  dl-DataToUL-ACK-DCI-1-2-r17               SetupRelease { DL-DataToUL-ACK-DCI-1-2-r17}
OPTIONAL, -- Need M
  ul-AccessConfigListDCI-1-1-r17            SetupRelease { UL-AccessConfigList-DCI-1-1-r17 }
OPTIONAL, -- Need M
  schedulingRequestResourceToAddModListExt-v1700 SEQUENCE (SIZE (1..maxNrofSR-Resources)) OF
SchedulingRequestResourceConfigExt-v1700
OPTIONAL, -- Need N
  dmrs-BundlingPUCCH-Config-r17             SetupRelease { DMRS-BundlingPUCCH-Config-r17 }
OPTIONAL, -- Need M
  dl-DataToUL-ACK-v1700                     SEQUENCE (SIZE (1..8)) OF INTEGER (16..31)
OPTIONAL, -- Need M
  dl-DataToUL-ACK-MulticastDCI-Format4-1-r17 SetupRelease { DL-DataToUL-ACK-MulticastDCI-Format4-1-
r17 }   OPTIONAL, -- Need M
  sps-PUCCH-AN-ListMulticast-r17            SetupRelease { SPS-PUCCH-AN-List-r16 }
OPTIONAL  -- Need M
  ]]
}
PUCCH-FormatConfig ::=              SEQUENCE {
  interslotFrequencyHopping                 ENUMERATED {enabled}
OPTIONAL, -- Need R
  additionalDMRS                            ENUMERATED {true}
OPTIONAL, -- Need R
  maxCodeRate                               PUCCH-MaxCodeRate
OPTIONAL, -- Need R
  nrofSlots                                 ENUMERATED {n2,n4,n8}
OPTIONAL, -- Need S
  pi2BPSK                                   ENUMERATED {enabled}
OPTIONAL, -- Need R
  simultaneousHARQ-ACK-CSI                  ENUMERATED {true}
OPTIONAL -- Need R
}
PUCCH-FormatConfigExt-r17 ::=       SEQUENCE {
  maxCodeRateLP-r17                         PUCCH-MaxCodeRate
OPTIONAL, -- Need R
  ...
}
PUCCH-MaxCodeRate ::=               ENUMERATED {zeroDot08, zeroDot15, zeroDot25, zeroDot35,
zeroDot45, zeroDot60, zeroDot80}
-- A set with one or more PUCCH resources
PUCCH-ResourceSet ::=               SEQUENCE {
  pucch-ResourceSetId                       PUCCH-ResourceSetId,
  resourceList                              SEQUENCE (SIZE (1..maxNrofPUCCH-ResourcesPerSet)) OF
PUCCH-ResourceId,
  maxPayloadSize                            INTEGER (4..256)
OPTIONAL  -- Need R
}
PUCCH-ResourceSetId ::=             INTEGER (0..maxNrofPUCCH-ResourceSets-1)
PUCCH-Resource ::=                  SEQUENCE {
  pucch-ResourceId                          PUCCH-ResourceId,
  startingPRB                               PRB-Id,
  intraSlotFrequencyHopping                 ENUMERATED { enabled }
OPTIONAL, -- Need R
  secondHopPRB                              PRB-Id
OPTIONAL, -- Need R
  format                                    CHOICE {
    format0                                         PUCCH-format0,
    format1                                         PUCCH-format1,
    format2                                         PUCCH-format2,
    format3                                         PUCCH-format3,
    format4                                         PUCCH-format4
  }
}
PUCCH-ResourceExt-v1610 ::=         SEQUENCE {
  interlaceAllocation-r16                   SEQUENCE {
    rb-SetIndex                                     INTEGER (0..4),
    interlace0                                      CHOICE {
```

-continued

```
        scs15                                          INTEGER (0..9),
        scs30                                          INTEGER (0..4)
    }
  }
OPTIONAL,   --Need R
  format-v1610                  CHOICE {
    interlace1-v1610                                   INTEGER (0..9),
    occ-v1610                                          SEQUENCE {
      occ-Length-v1610                                          ENUMERATED {n2,n4}
OPTIONAL, -- Need M
      occ-Index-v1610                                           ENUMERATED {n0,n1,n2,n3}
OPTIONAL    -- Need M
    }
  }
OPTIONAL,   -- Need R
  ...,
  [[
  formatExt-v1700               SEQUENCE {
    nrofPRBs-r17                            INTEGER (1..16)
  }
OPTIONAL,   -- Need R
  pucch-RepetitionNrofSlots-r17 ENUMERATED { n2,n4,n8 }
OPTIONAL    -- Need M
  ]]
}
PUCCH-ResourceId ::=         INTEGER (0..maxNrofPUCCH-Resources-1)
PUCCH-format0 ::=                           SEQUENCE {
  initialCyclicShift                                   INTEGER(0..11),
  nrofSymbols                                          INTEGER (1..2),
  startingSymbolIndex                                  INTEGER(0..13)
}
PUCCH-format1 ::=                           SEQUENCE {
  initialCyclicShift                                   INTEGER(0..11),
  nrofSymbols                                          INTEGER (4..14),
  startingSymbolIndex                                  INTEGER(0..10),
  timeDomainOCC                                        INTEGER(0..6)
}
PUCCH-format2 ::=                           SEQUENCE {
  nrofPRBs                                             INTEGER (1..16),
  nrofSymbols                                          INTEGER (1..2),
  startingSymbolIndex                                  INTEGER(0..13)
}
PUCCH-format3 ::=                           SEQUENCE {
  nrofPRBs                                             INTEGER (1..16),
  nrofSymbols                                          INTEGER (4..14),
  startingSymbolIndex                                  INTEGER(0..10)
}
PUCCH-format4 ::=                           SEQUENCE {
  nrofSymbols                                          INTEGER (4..14),
  occ-Length                                           ENUMERATED {n2,n4},
  occ-Index                                            ENUMERATED {n0,n1,n2,n3},
  startingSymbolIndex                                  INTEGER(0..10)
}
PUCCH-ResourceGroup-r16 ::=     SEQUENCE {
  pucch-ResourceGroupId-r16                 PUCCH-ResourceGroupId-r16,
  resourcePerGroupList-r16                  SEQUENCE (SIZE (1..maxNrofPUCCH-ResourcesPerGroup-
r16)) OF PUCCH-ResourceId
}
PUCCH-ResourceGroupId-r16 ::=   INTEGER (0..maxNrofPUCCH-ResourcesGroups-1-r16)
...
```

| PUCCH-Config field descriptions |
| --- |
| dl-DataToUL-ACK, dl-DataToUL-ACK-DCI-1-2<br>List of timing for given PDSCH to the DL ACK (see TS 38.213 [13], clause 9.1.2). The field dl-DataToUL-ACK applies to DCI format 1_1 and the field dl-Data ToUL-ACK-DCI-1-2 applies to DCI format 1_2 (see TS 38.212 [17], clause 7.3.1 and TS 38.213 [13], clause 9.2.3). If dl-DataToUL-ACK-r16 or dl-DataToUL-ACK-r17 is signalled, UE shall ignore the dl-DataToUL-ACK (without suffix). The value −1 corresponds to “inapplicable value” for the case where the A/N feedback timing is not explicitly included at the time of scheduling PDSCH. The fields dl-Data ToUL-ACK-r17 and dl-DataToUL-ACK-DCI-1-2-r17 are only applicable for SCS of 480 kHz or 960 KHz. |
| dl-DataToUL-ACK-MulticastDCI-Format4-1<br>List of timing for given group-common PDSCH to the DL ACK (see TS 38.213 [13], clause 9.1.2). The field dl-DataToUL-ACK-MulticastDciFormat4-1 applies to DCI format 1_0 for MBS multicast (see TS 38.212 [17], clause 7.3.1 and TS 38.213 [13], clause 9.2.3). |

-continued

| PUCCH-Config field descriptions |
|---|
| dmrs-BundlingPUCCH-Config<br>Configuration of the parameters for DMRS bundling for PUCCH (see TS 38.214 [19], clause 6.1.7). DMRS bundling for PUCCH is not supported for PUCCH format 0/2. |
| dmrs-UplinkTransformPrecodingPUCCH<br>This field is used for PUCCH formats 3 and 4 according to TS 38.211, Clause 6.4.1.3.3.1. |
| format0<br>Parameters that are common for all PUCCH resources of format 0. |
| format1<br>Parameters that are common for all PUCCH resources of format 1. |
| format2<br>Parameters that are common for all PUCCH resources of format 2. |
| format3<br>Parameters that are common for all PUCCH resources of format 3. |
| format4<br>Parameters that are common for all PUCCH resources of format 4 |
| mappingPattern<br>Indicates whether the UE should follow Cyclical mapping pattern or Sequential mapping pattern for when a PUCCH resource used for repetitions of a PUCCH transmission includes first and second spatial settings for FR2, or first and second sets of power control parameters for FR1 (see TS 38.213 [13], clause 9.2.6) |
| numberOfBitsForPUCCH- ResourceIndicatorDCI-1-2<br>Configuration of the number of bits for “PUCCH resource indicator” in DCI format 1_2 (see TS 38.212 [17], clause 7.3.1 and TS 38.213 [13], clause 9.2.3). |
| powerControlSetInfoToAddModList<br>Configures power control sets for repetition of a PUCCH transmission in FR1. The two power control sets to be used are determined by the XX MAC CE (see TS 38.321 [3], clause xxx). |
| resourceGroupToAddModList, resourceGroupToReleaseList<br>Lists for adding and releasing groups of PUCCH resources that can be updated simultaneously for spatial relations with a MAC CE |
| resourceSetToAddModList, resourceSetToReleaseList<br>Lists for adding and releasing PUCCH resource sets (see TS 38.213 [13], clause 9.2). |
| resourceToAddModList, resourceToAddModListExt, resourceToReleaseList<br>Lists for adding and releasing PUCCH resources applicable for the UL BWP and serving cell in which the PUCCH-Config is defined. The resources defined herein are referred to from other parts of the configuration to determine which resource the UE shall use for which report. If the network includes of resourceToAddModListExt, it includes the same number of entries, and listed in the same order, as in resource ToAddModList. |
| secondTPCFieldDCI-1-1, secondTPCFieldDCI-1-2<br>A second TPC field can be configured via RRC for DCI-1-1 and DCI-1-2. Each TPC field is for each closed-loop index value respectively (i.e., 1st /2nd TPC fields correspond to “closedLoopIndex” value = 0 and 1. |
| spatialRelationInfoToAddModList, spatialRelationInfoToAddModListSizeExt, spatialRelationInfoToAddModListExt<br>Configuration of the spatial relation between a reference RS and PUCCH. Reference RS can be SSB/CSI-RS/SRS. If the list has more than one element, MAC-CE selects a single element (see TS 38.321 [3], clause 5.18.8 and TS 38.213 [13], clause 9.2.2). The UE shall consider entries in spatialRelationInfoToAddModList and in spatialRelationInfoToAddModListSizeExt as a single list, i.e. an entry created using spatialRelationInfoToAddModList can be modified using spatialRelationInfoToAddModListSizeExt (or deleted using spatialRelationInfoToReleaseListSizeExt) and vice-versa. If the network includes spatialRelationInfoToAddModListExt, it includes the same number of entries, and listed in the same order, as in the concatenation of spatialRelationInfoToAddModList and of spatialRelationInfoToAddModListSizeExt. |
| spatialRelationInfoToReleaseList, spatialRelationInfoToReleaseListSizeExt, spatialRelationInfoToReleaseListExt<br>Lists of spatial relation configurations between a reference RS and PUCCH to be released by the UE. |
| sps-PUCCH-AN-List<br>Indicates a list of PUCCH resources for DL SPS HARQ ACK. The field maxPayloadSize is absent for the first and the last SPS-PUCCH-AN in the list. If configured, this overrides n1PUCCH-AN in SPS-config. |
| sps-PUCCH-AN-ListMulticast<br>The field is used to configure the list of PUCCH resources per HARQ ACK codebook for MBS multicast. |
| subslotLengthForPUCCH<br>Indicate the sub-slot length for sub-slot based PUCCH feedback in number of symbols (see TS 38.213 [13], clause 9). Value n2 corresponds to 2 symbols, value n6 corresponding to 6 symbols, value n7 corresponds to 7 symbols. For normal CP, the value is either n2 or n7. For extended CP, the value is either n2 or n6. |

In the 3GPP specification ([3] 3GPP 38.300 v17.0.0), sidelink architecture is introduced:

16.9 Sidelink 16.9.1 General

In this clause, an overview of NR sidelink communication and how NG-RAN supports NR sidelink communication and V2X sidelink communication is given. V2X sidelink communication is specified in TS 36.300 [2].

The NG-RAN architecture supports the PC5 interface as illustrated in FIG. 16.9.1-1. Sidelink transmission and reception over the PC5 interface are supported when the UE is inside NG-RAN coverage, irrespective of which RRC state the UE is in, and when the UE is outside NG-RAN coverage.

Figure 8:
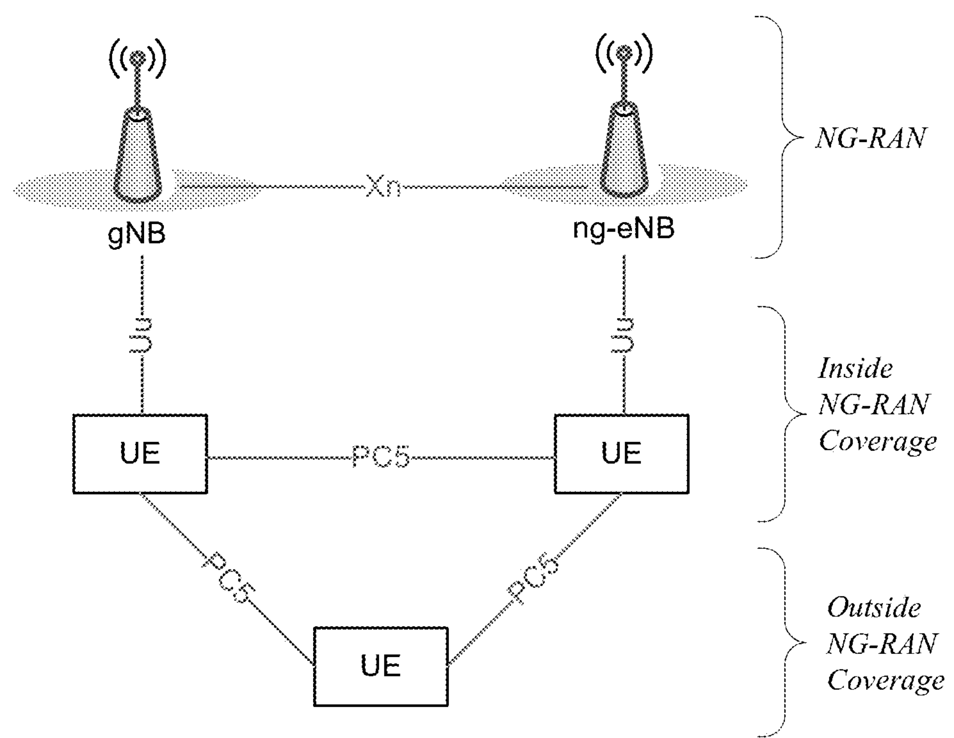
FIG. 8 is a reproduction of FIG. 16.9.1-1: NG-RAN Architecture supporting the PC5 interface, from 3GPP 38.300 v17.0.0.

FIG. 8 is a reproduction of FIG. 16.9.1-1: NG-RAN Architecture supporting the PC5 interface, from 3GPP 38.300 v17.0.0.

Support of V2X services via the PC5 interface can be provided by NR sidelink communication and/or V2X sidelink communication. NR sidelink communication may be used to support other services than V2X services.

NR sidelink communication can support one of three types of transmission modes for a pair of a Source Layer-2 ID and a Destination Layer-2 ID in the AS:

- Unicast transmission, characterized by:
  - Support of one PC5-RRC connection between peer UEs for the pair;

Transmission and reception of control information and user traffic between peer UEs in sidelink;

Support of sidelink HARQ feedback;

Support of sidelink transmit power control;

Support of RLC AM;

Detection of radio link failure for the PC5-RRC connection.

Groupcast transmission, characterized by:

Transmission and reception of user traffic among UEs belonging to a group in sidelink;

Support of sidelink HARQ feedback.

Broadcast transmission, characterized by:

Transmission and reception of user traffic among UEs in sidelink.

In New Radio (NR), Sidelink (SL) communication is introduced. A User Equipment (UE) (or device) could perform SL communication with another UE (via unicast, groupcast, and/or broadcast) on a sidelink interface (e.g., PC5). The UE could transmit and/or receive SL data to other UEs with or without indication of a Network (NW). In Release 17, SL discontinuous reception is introduced for power saving for sidelink device to discontinuously monitor Physical Sidelink Shared Channel (PSSCH) and/or Sidelink Control Information (SCI) on sidelink channel(s). In SL Discontinuous Reception (DRX), several timers are introduced for the UE to derive active time on SL in order to monitor SCI:

sl-drx-onDurationTimer: the duration at the beginning of an SL DRX cycle;

sl-drx-SlotOffset: the delay before starting the sl-drx-onDurationTimer;

sl-drx-InactivityTimer (except for the broadcast transmission): the duration after the first slot of SCI (i.e., 1st stage SCI and 2nd stage SCI) reception in which an SCI indicates a new SL transmission for the Medium Access Control (MAC) entity;

sl-drx-RetransmissionTimer (per Sidelink process except for the broadcast transmission): the maximum duration until a SL retransmission is received;

sl-drx-StartOffset: the slot where the SL DRX cycle starts;

sl-drx-Cycle: the Sidelink DRX cycle;

sl-drx-HARQ-RTT-Timer (per Sidelink process except for the broadcast transmission): the minimum duration before a SL Hybrid Automatic Repeat Request (HARQ) retransmission is expected by the MAC entity.

The UE could be configured with the one or more timers above by a dedicated signaling from a network (e.g., SL-ConfigDedicatedNR) and/or by a (broadcast) system information (e.g., SIB12) and/or by a transmitter UE (Transmitter (Tx) UE) via a PC5-Radio Resource Control (RRC) signaling (e.g., RRCReconfigurationSidelink). The one or more timers could be associated with unicast, groupcast, and/or broadcast. The UE could maintain or be configured with a set of the one or more timers for a PC5 connection (e.g., per destination (ID)). Alternatively, the UE could maintain or be configured with a different set of the one or more timers for SL data with different Quality of Service (QoS) or different priorities.

For SL transmission, the UE could be configured with resource allocation mode 1 (e.g., network scheduling mode, transmit SL communication based on network scheduling, configured with sl-ScheduledConfig) and/or resource allocation mode 2 (autonomous resource selection mode, configured with sl-UE-SelectedConfig).

For receiving SL communication scheduling from network, the UE could be configured with timers associated with Uu interface associated with sidelink operation with resource allocation mode 1. The timers could include drx-HARQ-Round Trip Time (RTT)-TimerSL and drx-RetransmissionTimerSL. When or if the UE receives a Physical Downlink Control Channel (PDCCH) indicating a SL transmission, the UE could start drx-HARQ-RTT-TimerSL for a corresponding HARQ process in the first symbol after the end of a corresponding Physical Uplink Control Channel (PUCCH) transmission carrying a HARQ feedback (e.g., HARQ Negative Acknowledgement (NACK) feedback, or negative acknowledgement) or when the PUCCH transmission is not transmitted due to Uplink (UL)/SL prioritization. After expiry of drx-HARQ-RTT-TimerSL, the UE could start drx-RetransmissionTimerSL for the corresponding HARQ process. The UE could monitor PDCCH (e.g., for receiving scheduled SL grant for retransmission) on Serving Cell(s) when drx-RetransmissionTimerSL is running.

Figure 9:
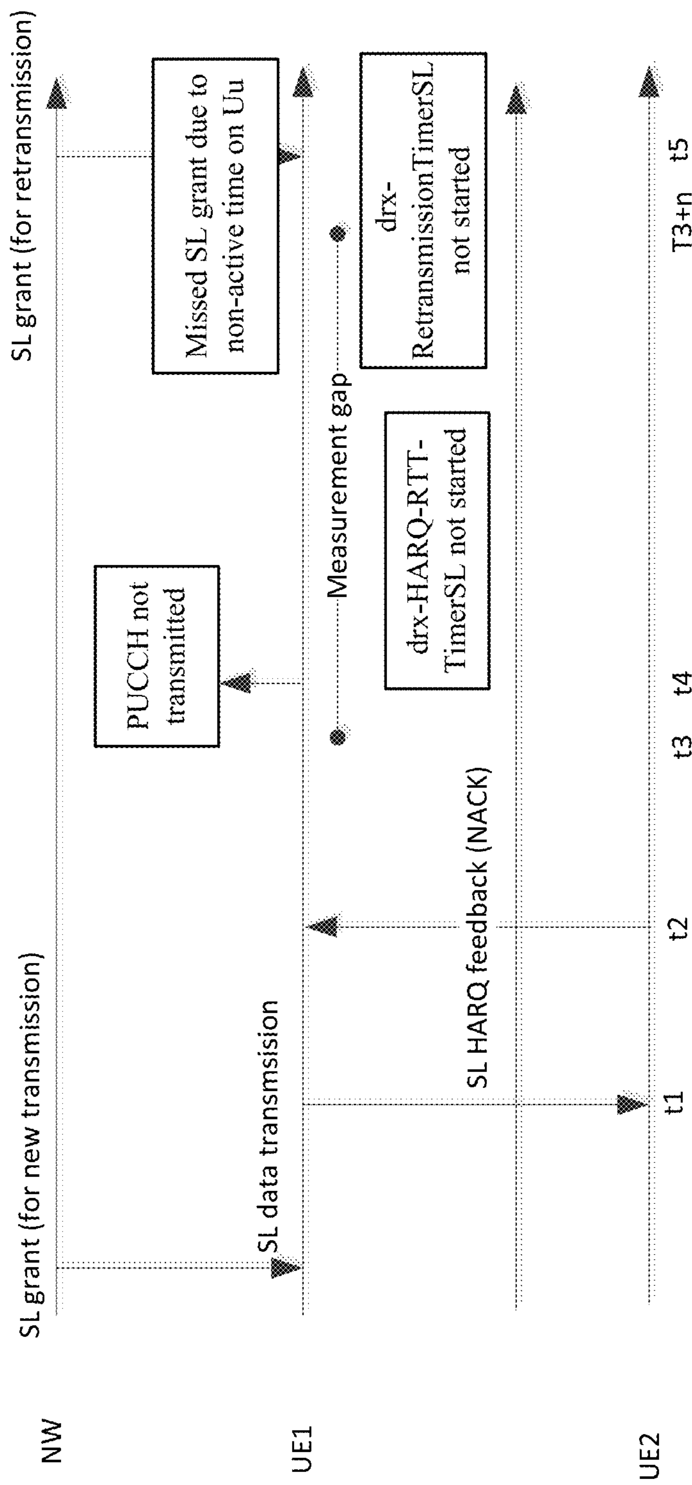
FIG. 9 is an example where a UE may not receive a SL grant since the UE may not monitor PDCCH due to the retransmission timer not being started due to HARQ feedback not transmitting on PUCCH during measurement gaps, in accordance with embodiments of the present invention.

A UE could be configured with measurement gap(s) for one or more Serving Cells (e.g., via measGapConfig). During activated measurement gaps, the UE does not perform transmission of HARQ feedback. This includes not transmitting HARQ feedback associated with a SL transmission on PUCCH. However, the network may consider a retransmission is needed (e.g., since no positive feedback is received) and schedule a retransmission SL grant to the UE. The UE may not receive the SL grant since the UE may not monitor PDCCH due to retransmission timer not being started due to HARQ feedback is not transmitted on PUCCH during measurement gaps. An example of the issue is shown in FIG. 9. UE1 performs SL communication with UE2. The UE1 is configured with resource allocation mode 1. The NW schedule a SL grant (for new transmission) to the UE1. At timing t1, the UE1 performs SL data transmission to UE2. The UE2 does not decode the data successfully and transmits a SL HARQ feedback indicating a negative acknowledgement (NACK) to UE1 at timing t2. The UE1 is configured or provided with PUCCH resource (e.g., indicated via Downlink Control Information (DCI) associated with the SL grant or via sidelink configured grant configuration) associated with the SL transmission and/or the SL HARQ feedback on Uu at timing t4. The UE1 is configured with measurement gap configuration, and an active measurement gap is during t3 and t3+n. The UE1 does not perform the PUCCH transmission (for indicating negative acknowledgement) via the PUCCH resource. Since the UE1 does not start DRX timers (e.g., HARQ-RTT-timer or retransmission timer), the UE1 may not monitor PDCCH when the network provides a SL grant for retransmission of the SL transmission.

Moreover, the UE could be operating on unlicensed spectrum, the UE could perform Listen-Before-Talk (LBT) operation in order to perform transmission on unlicensed spectrum. If the UE experiences LBT failure and fails to transmit HARQ feedback associated with SL, the UE may not be able to receive SL retransmission grant for corresponding HARQ process due to timers being not started. In the present invention, methods are introduced for the UE to start Uu DRX timers to monitor PDCCH when a feedback associated with SL is not transmitted on PUCCH.

One concept or aspect of the present invention is that a UE could start or restart a first timer (for a HARQ process) (in the first symbol) after the end of a PUCCH resource when a PUCCH transmission associated with the PUCCH resource is not transmitted due to a (active) measurement gap. The PUCCH resource and/or the PUCCH transmission could be located or occur in the measurement gap. The UE could start the first timer in a first symbol after the PUCCH resource.

Additionally and/or alternatively, (when or if a HARQ feedback associated with the first timer indicates a negative acknowledgement of a SL transmission), the UE could start or restart a second timer in response to an expiry of the first timer. The UE could start or restart the second timer in the first symbol after the expiry of the first timer. Additionally and/or alternatively, when or if the HARQ feedback associated with the first timer indicates a positive acknowledgement of a SL transmission, the UE may not start or restart the second timer when the first timer expires. The UE could start or restart the second timer if or when the first timer expires and when or if HARQ feedback associated with the first timer is not transmitted on PUCCH due to measurement gap. The HARQ feedback could be carried, included, or indicated in the PUCCH transmission associated with the PUCCH resource.

The PUCCH transmission could be associated with a SL transmission. The UE could perform SL communication with a second UE. The UE could be a transmitter (Tx) UE of the SL transmission and the second UE could be a receiver (Rx) UE of the SL transmission. The SL transmission could be a transmission on PC5 interface (and not on Uu interface and not transmitted to/from network). The PUCCH transmission could be a HARQ feedback associated with the SL transmission. The PUCCH transmission could be associated with a transmission result/reception result associated with the SL transmission. The PUCCH transmission may not be associated with a transmission/reception result of a Downlink (DL) reception or a UL transmission. The PUCCH transmission could indicate a positive acknowledgement. The UE could indicate a negative acknowledgment (or SL HARQ NACK) in the PUCCH transmission (to the network) if or when the UE receives a negative acknowledgement (e.g., NACK or indication of an unsuccessful reception of the SL transmission) from the second UE. Alternatively, the UE could indicate a negative acknowledgment (or SL HARQ NACK) in the PUCCH transmission (to the network) if or when the UE determines that a retransmission for (SL data in) the SL transmission is required. Additionally and/or alternatively, the UE could indicate a negative acknowledgment (or SL HARQ NACK) in the PUCCH transmission (to the network) if or when the UE does not receive an acknowledgment (from the second UE) associated with the SL transmission. Alternatively, the PUCCH transmission could indicate a positive acknowledgement.

Figure 10:
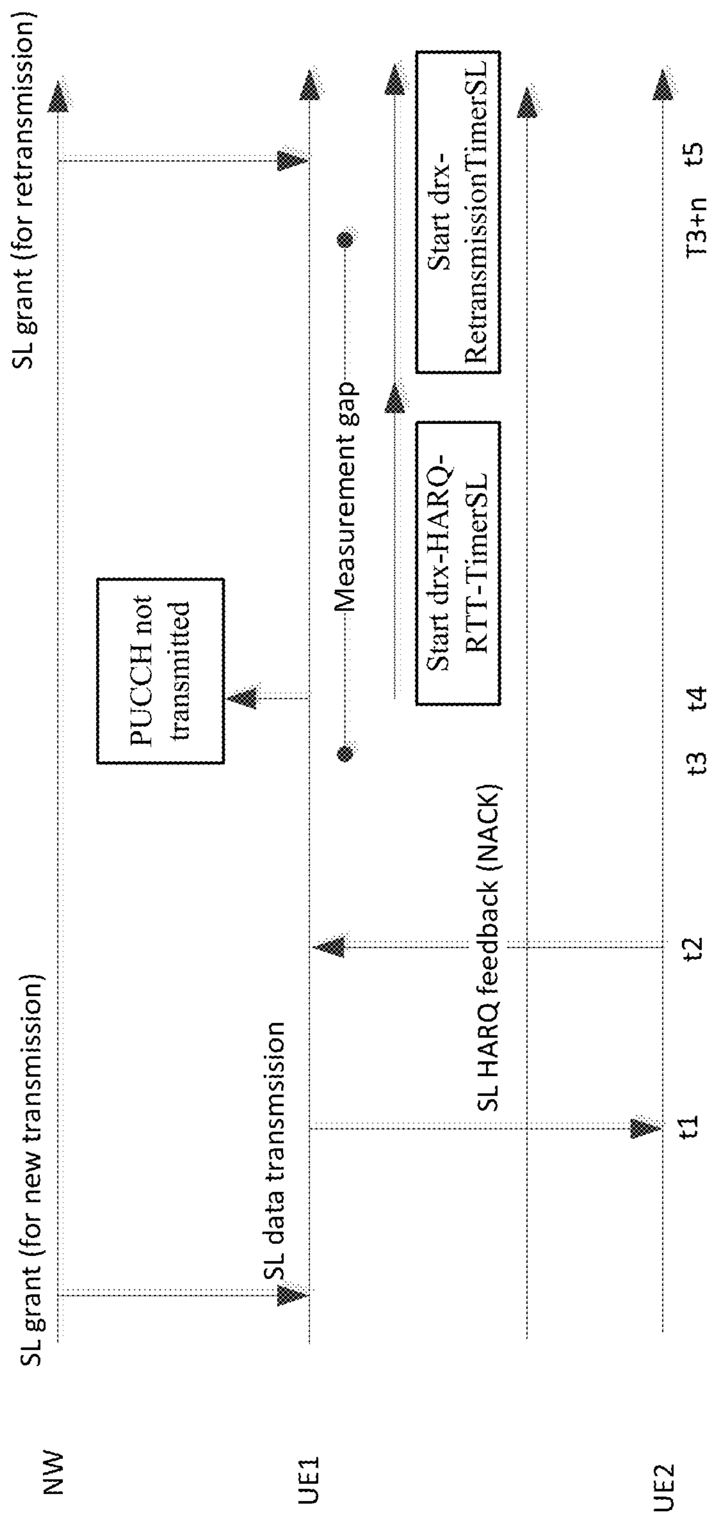
FIG. 10 is an example of a UE1 performing SL communication with UE2, wherein the UE1 is configured with resource allocation mode 1, and the NW schedules a SL grant (for new transmission) to the UE1, in accordance with embodiments of the present invention.

An example is shown in FIG. 10. UE1 performs SL communication with UE2. The UE1 is configured with resource allocation mode 1. The NW schedules a SL grant (for new transmission) to the UE1. At timing t1, the UE1 performs SL data transmission to UE2. The UE2 does not decode the data successfully and transmits a SL HARQ feedback indicating a negative acknowledgement (NACK) to UE1 at timing t2. The UE1 is configured or provided with PUCCH resource (e.g., indicated via DCI associated with the SL grant or via sidelink configured grant configuration) associated with the SL transmission and/or the SL HARQ feedback on Uu at timing t4. The UE1 is configured with measurement gap configuration, and an active measurement gap is during t3 and t3+n. The UE1 does not perform the PUCCH transmission (for indicating negative acknowledgement) via the PUCCH resource. The UE1 starts the drx-HARQ-RTT-TimerSL for a corresponding HARQ process (of the SL transmission) in the first symbol after the PUCCH resource (when the PUCCH is not transmitted due to measurement gap). In response to expiry of the drx-HARQ-RTT-TimerSL, the UE starts a drx-RetransmissionTimerSL (for the corresponding HARQ process). At timing t5, the network could schedule a SL grant (for retransmission associated with the SL data transmission). The UE monitors PDCCH associated with the network when the drx-RetransmissionTimerSL is running.

Additionally and/or alternatively, the UE could start or restart the first timer (for a HARQ process) (in the first symbol) after the end of a PUCCH resource when a PUCCH transmission associated with the PUCCH resource is not transmitted due to a LBT failure (associated with the PUCCH transmission). The MAC entity of the UE could receive a LBT failure indication (e.g., from lower layer of the UE). Additionally and/or alternatively, the UE could start or restart the first timer (for a HARQ process) after the end of the PUCCH resource when the PUCCH transmission is transmitted and a LBT failure indication (associated with the PUCCH transmission) is received from lower layers (e.g., physical layer of the UE).

Additionally and/or alternatively, (when or if a HARQ feedback associated with the first timer indicates a negative acknowledgement of a SL transmission), the UE could start or restart the second timer (in the first symbol) after expiry of the first timer if or when the PUCCH transmission is transmitted and a LBT failure indication (associated with the PUCCH transmission) is received by the UE. Additionally and/or alternatively, when or if the HARQ feedback associated with the first timer indicates a positive acknowledgement of a SL transmission, the UE may not start or restart the second timer when the first timer expires. The HARQ feedback could be carried, included, or indicated in the PUCCH transmission associated with the PUCCH resource.

Figure 11:
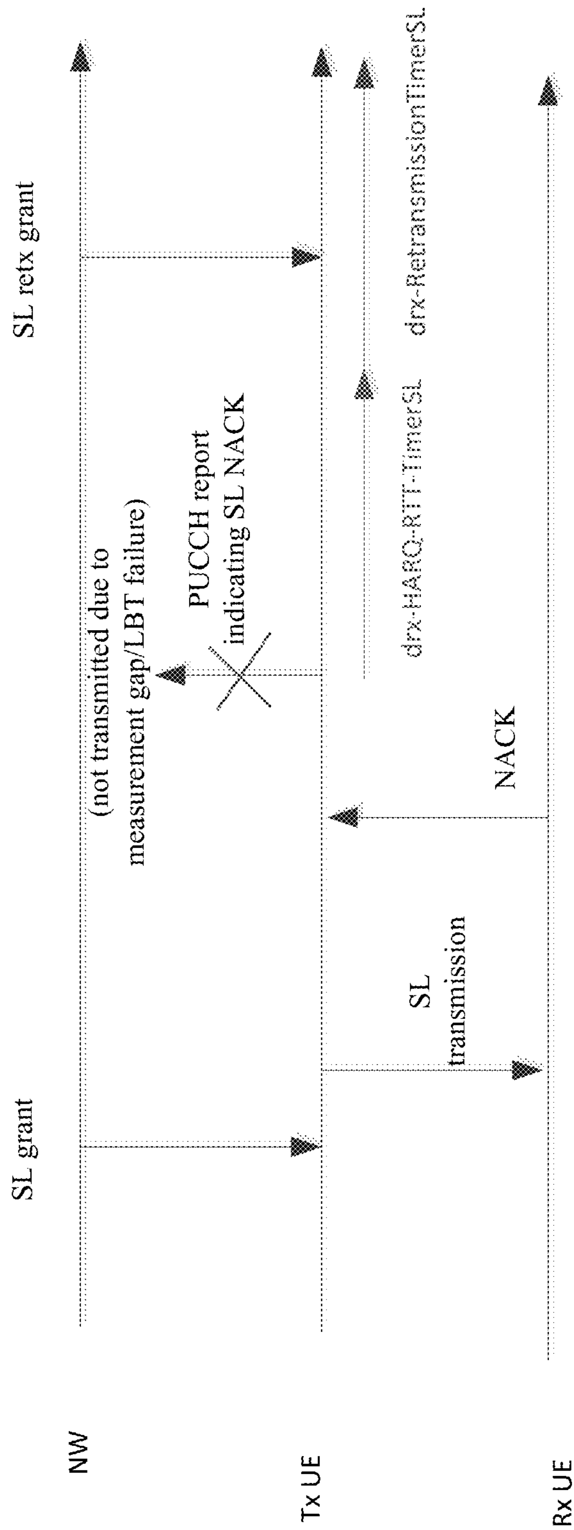
FIG. 11 is an example where a Tx UE could be scheduled, by a NW, a SL grant indicating a SL transmission, the UE performs the SL transmission (via a SL HARQ process) to a Rx UE, and the UE receives a SL HARQ feedback (associated with the SL HARQ process) from the Rx UE, in accordance with embodiments of the present invention.

Additionally and/or alternatively, another example is shown in FIG. 11. A Tx UE could be scheduled, by a NW, a SL grant indicating a SL transmission. The UE performs the SL transmission (via a SL HARQ process) to a Rx UE. The UE receives a SL HARQ feedback (associated with the SL HARQ process) from the Rx UE. The SL HARQ feedback could be negative acknowledgement (indicating unsuccessful decoding of the SL transmission). The Tx UE could generate and/or indicate a physical layer of the Tx UE to signal a negative acknowledgement (as a SL HARQ feedback associated with the SL transmission) on a PUCCH associated with the SL grant and/or the SL transmission (e.g., the slot location of the PUCCH resource could be indicated in a DCI associated with the SL grant). The UE may not be able to transmit the PUCCH (indicating the negative acknowledgement) due to measurement gap and/or LBT failure. When the PUCCH is not transmitted due to measurement gap or LBT failure, the Tx UE starts drx-HARQ-RTT-TimerSL in a first symbol after the end of the PUCCH resource. In response to expiry of the drx-HARQ-RTT-TimerSL and the SL HARQ feedback on the PUCCH is NACK, the Tx UE starts drx-RetransmissionTimerSL. The Tx UE could monitor PDCCH (or be in DRX active time) when drx-RetransmissionTimerSL is running.

For the concepts and examples disclosed above, the following aspects and embodiments can be implemented, performed, added, or included.

In various embodiments, the first timer could be used to control the timing to start or restart the second timer. The first timer could be used to estimate round trip time, e.g., between a (first device) first UE and a network.

In various embodiments, the second timer could be used to control timing (for the (first) UE) to monitor PDCCH, e.g., in order to receive SL grant for retransmission of the SL transmission. The (first) UE could monitor PDCCH when the second timer is running. Active Time for Serving Cell(s)

in a DRX group associated with the second timer could include the time while the second timer is running.

In various embodiments, the UE could be configured with sidelink resource allocation mode-1 (e.g., sl-ScheduledConfig). The UE may not be configured with sidelink resource allocation mode-2 (e.g., sl-uselectconfig).

In various embodiments, the first timer could be drx-HARQ-RTT-TimerSL.

In various embodiments, the UE could be configured with PUCCH resource(s) for indicating SL transmission result (e.g., sl-PUCCH-config).

In various embodiments, the second timer could be drx-RetransmissionTimerSL.

In various embodiments, the PUCCH transmission could be a HARQ NACK feedback for the corresponding HARQ process. Alternatively, the PUCCH transmission could be a HARQ Acknowledgement (ACK) feedback (e.g., positive acknowledgement) for the corresponding HARQ process.

All concepts, embodiments, and examples above and herein can be merged into new concepts and/or new concept combinations.

Figure 12:
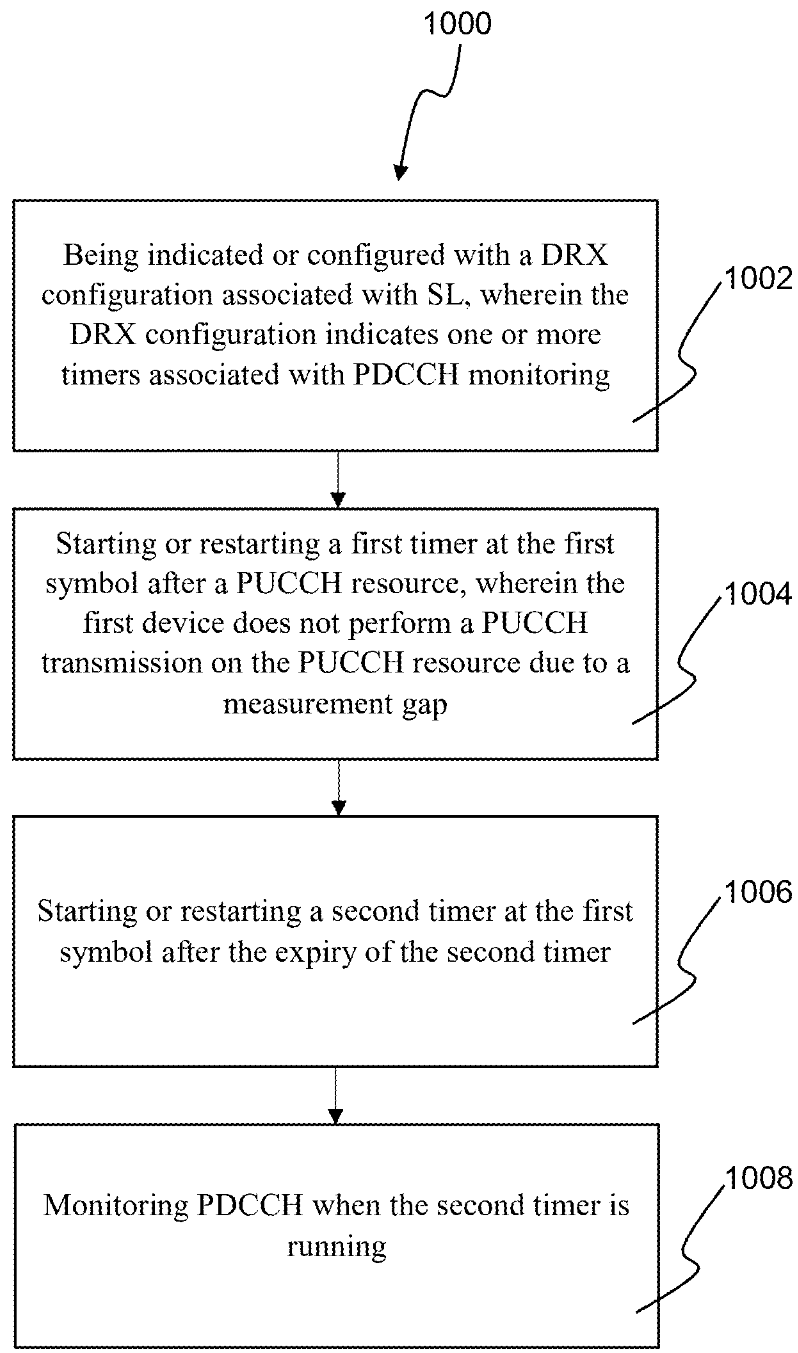
FIG. 12 is a flow diagram of a first device starting or restarting a first timer at the first symbol after a PUCCH resource, wherein the first device does not perform a PUCCH transmission on the PUCCH resource due to a measurement gap, in accordance with embodiments of the present invention.

Referring to FIG. 12, with this and other concepts, systems, and methods of the present invention, a method 1000 for a first device in a wireless communication system comprises being indicated or configured with a DRX configuration associated with SL, wherein the DRX configuration indicates one or more timers associated with PDCCH monitoring (step 1002), starting or restarting a first timer at the first symbol after a PUCCH resource, wherein the first device does not perform a PUCCH transmission on the PUCCH resource due to a measurement gap (step 1004), starting or restarting a second timer at the first symbol after the expiry of the second timer (step 1006), and monitoring PDCCH when the second timer is running (step 1008).

Referring back to FIGS. 3 and 4, in one or more embodiments from the perspective of a first device, the device 300 includes a program code 312 stored in memory 310 of the transmitter. The CPU 308 could execute program code 312 to: (i) be indicated or configured with a DRX configuration associated with SL, wherein the DRX configuration indicates one or more timers associated with PDCCH monitoring; (ii) start or restart a first timer at the first symbol after a PUCCH resource, wherein the first device does not perform a PUCCH transmission on the PUCCH resource due to a measurement gap; (iii) start or restart a second timer at the first symbol after the expiry of the second timer; and (iv) monitor PDCCH when the second timer is running. Moreover, the CPU 308 can execute the program code 312 to perform all of the described actions, steps, and methods described above, below, or otherwise herein.

Figure 13:
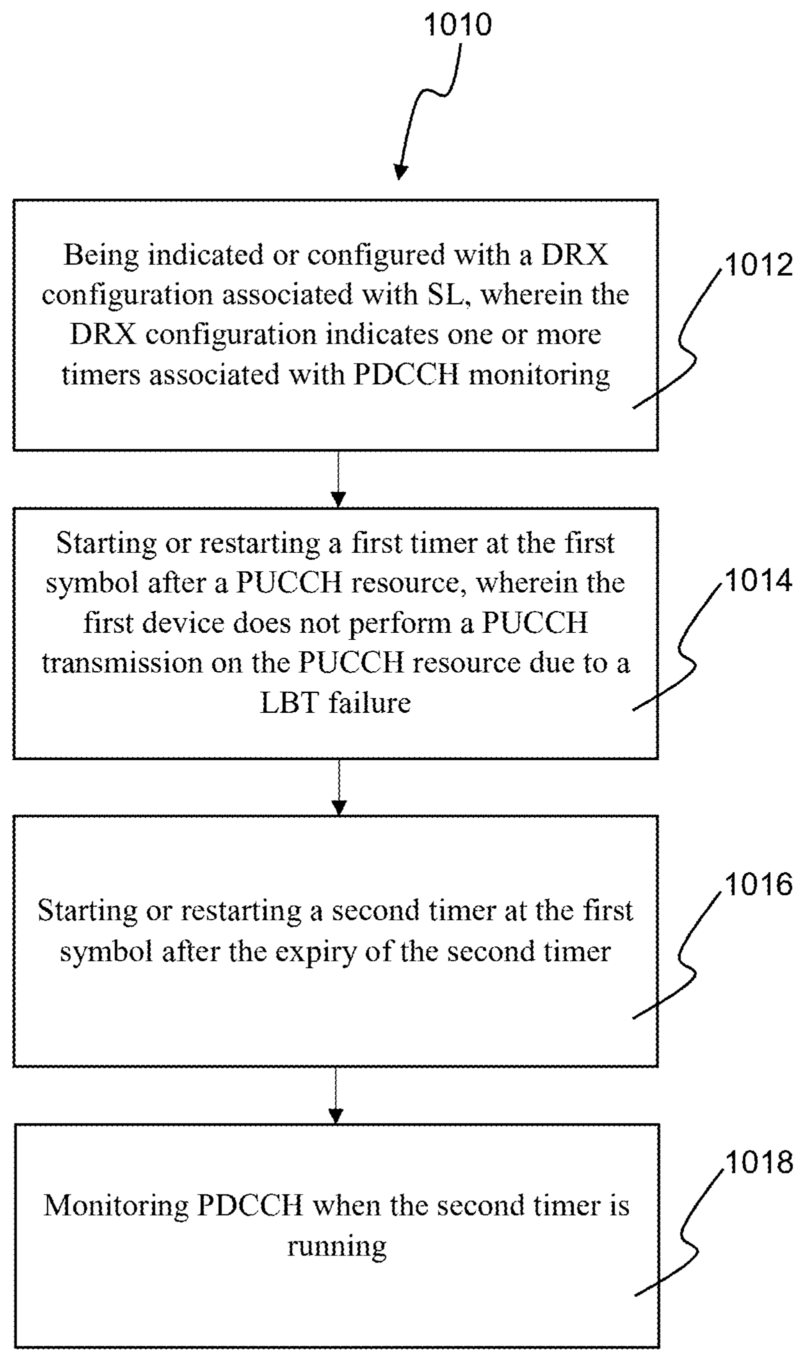
FIG. 13 is a flow diagram of a first device starting or restarting a first timer at the first symbol after a PUCCH resource, wherein the first device does not perform a PUCCH transmission on the PUCCH resource due to a LBT failure, in accordance with embodiments of the present invention.

Referring to FIG. 13, with this and other concepts, systems, and methods of the present invention, a method 1010 for a first device in a wireless communication system comprises being indicated or configured with a DRX configuration associated with SL, wherein the DRX configuration indicates one or more timers associated with PDCCH monitoring (step 1012), starting or restarting a first timer at the first symbol after a PUCCH resource, wherein the first device does not perform a PUCCH transmission on the PUCCH resource due to a LBT failure (step 1014), starting or restarting a second timer at the first symbol after the expiry of the second timer (step 1016), and monitoring PDCCH when the second timer is running (step 1018).

Referring back to FIGS. 3 and 4, in one or more embodiments from the perspective of a first device, the device 300 includes a program code 312 stored in memory 310 of the transmitter. The CPU 308 could execute program code 312 to: (i) be indicated or configured with a DRX configuration associated with SL, wherein the DRX configuration indicates one or more timers associated with PDCCH monitoring; (ii) start or restart a first timer at the first symbol after a PUCCH resource, wherein the first device does not perform a PUCCH transmission on the PUCCH resource due to a LBT failure; (iii) start or restart a second timer at the first symbol after the expiry of the second timer; and (iv) monitor PDCCH when the second timer is running. Moreover, the CPU 308 can execute the program code 312 to perform all of the described actions, steps, and methods described above, below, or otherwise herein.

Figure 14:
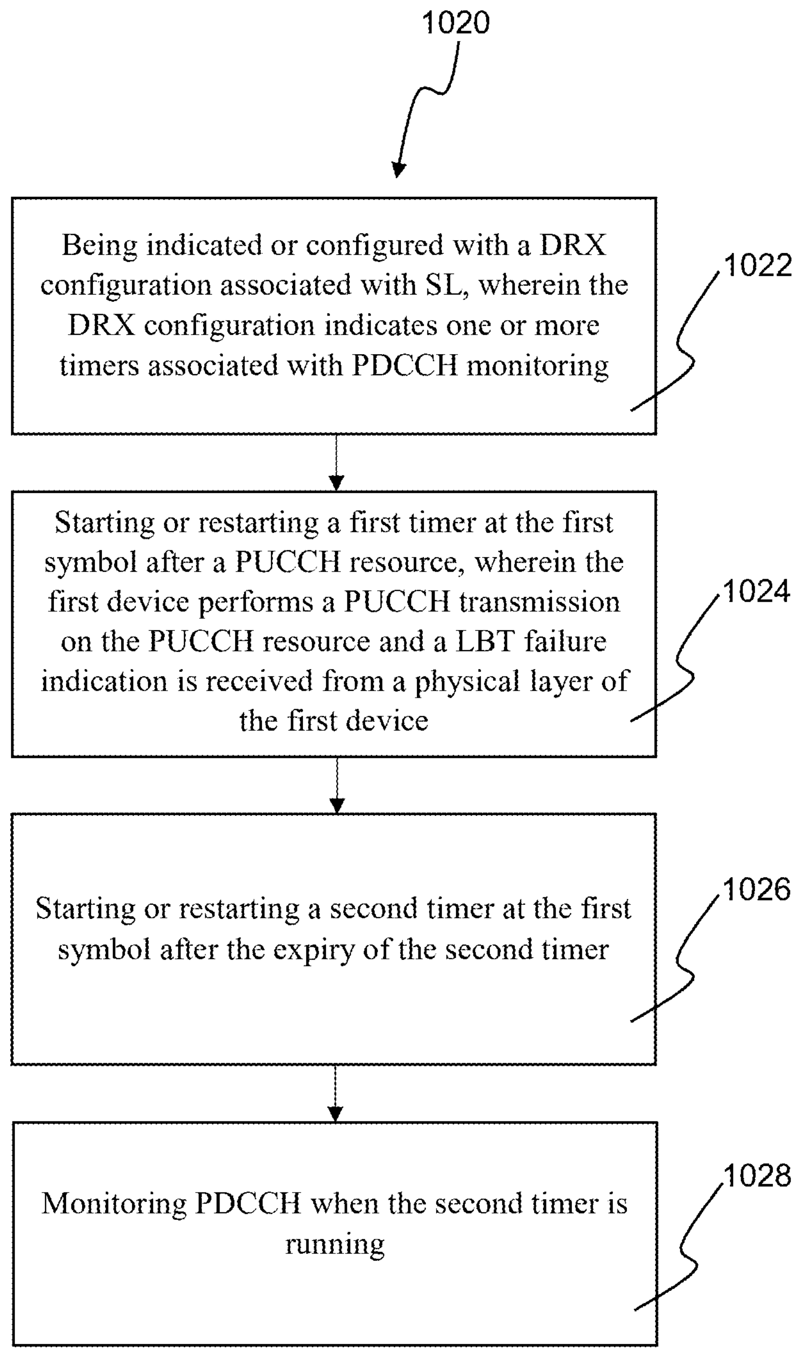
FIG. 14 is a flow diagram of a first device starting or restarting a first timer at the first symbol after a PUCCH resource, wherein the first device performs a PUCCH transmission on the PUCCH resource and a LBT failure indication is received from a physical layer of the first device, in accordance with embodiments of the present invention.

Referring to FIG. 14, with this and other concepts, systems, and methods of the present invention, a method 1020 for a first device in a wireless communication system comprises being indicated or configured with a DRX configuration associated with SL, wherein the DRX configuration indicates one or more timers associated with PDCCH monitoring (step 1022), starting or restarting a first timer at the first symbol after a PUCCH resource, wherein the first device performs a PUCCH transmission on the PUCCH resource and a LBT failure indication is received from a physical layer of the first device (step 1024), starting or restarting a second timer at the first symbol after the expiry of the second timer (step 1026), and monitoring PDCCH when the second timer is running (step 1028).

Referring back to FIGS. 3 and 4, in one or more embodiments from the perspective of a first device, the device 300 includes a program code 312 stored in memory 310 of the transmitter. The CPU 308 could execute program code 312 to: (i) be indicated or configured with a DRX configuration associated with SL, wherein the DRX configuration indicates one or more timers associated with PDCCH monitoring; (ii) start or restart a first timer at the first symbol after a PUCCH resource, wherein the first device performs a PUCCH transmission on the PUCCH resource and a LBT failure indication is received from a physical layer of the first device; (iii) start or restart a second timer at the first symbol after the expiry of the second timer; and (iv) monitor PDCCH when the second timer is running. Moreover, the CPU 308 can execute the program code 312 to perform all of the described actions, steps, and methods described above, below, or otherwise herein.

In various embodiments disclosed above and herein, the first device performs a SL transmission of SL data to a second device, wherein the second device transmits a SL HARQ feedback on PC5 interface or on Sidelink to the first device.

In various embodiments disclosed above and herein, the first device instructs a physical layer of the first device to generate a negative acknowledgement for the PUCCH transmission on the PUCCH resource if or when a retransmission is required for the SL data.

In various embodiments disclosed above and herein, the first device instructs a physical layer of the first device to generate a positive or negative acknowledgement for the PUCCH transmission on the PUCCH resource based on a SL HARQ feedback from the second device associated with the SL data.

In various embodiments disclosed above and herein, the first device does not monitor PDCCH when the first timer is running.

In various embodiments disclosed above and herein, the first timer is drx-HARQ-RTT-TimerSL.

In various embodiments disclosed above and herein, the second timer is drx-RetransmissionTimerSL.

In various embodiments disclosed above and herein, the PUCCH transmission is a HARQ NACK feedback associated with a SL transmission from the first device to a second device.

In various embodiments disclosed above and herein, the PUCCH transmission is a HARQ ACK feedback associated with a SL transmission from the first device to a second device.

Figure 15:
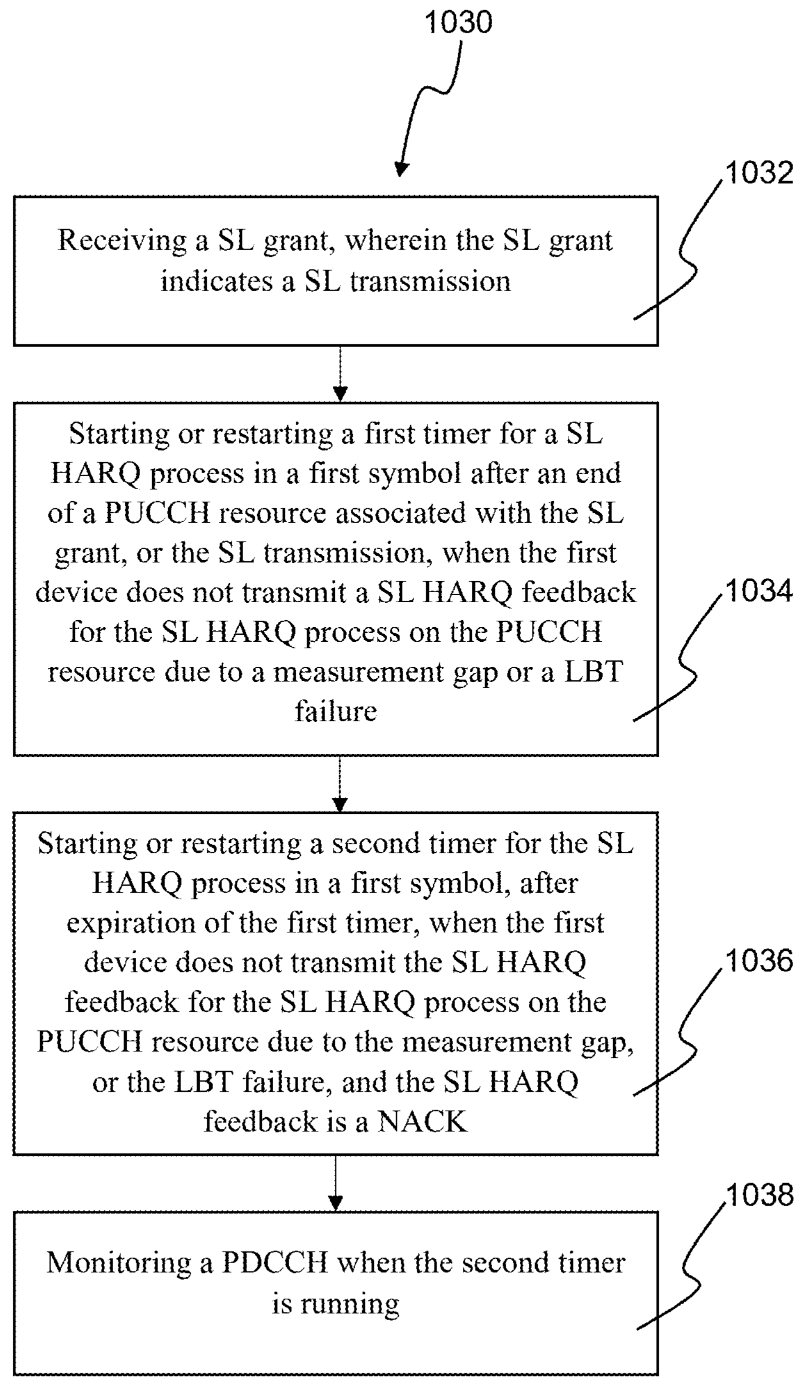
FIG. 15 is a flow diagram of a first device starting or restarting a first timer for a SL HARQ process in a first symbol after the end of a PUCCH resource associated with the SL grant, or the SL transmission, when the first device does not transmit a SL HARQ feedback for the SL HARQ process on the PUCCH resource due to a measurement gap or a LBT failure, in accordance with embodiments of the present invention.

Referring to FIG. 15, with this and other concepts, systems, and methods of the present invention, a method 1030 for a first device (e.g., a first UE) in a wireless communication system comprises receiving a SL grant (from network), wherein the SL grant indicates a SL transmission (step 1032), starting or restarting a first timer for a SL HARQ process in a first symbol after the end of a PUCCH resource associated with the SL grant, or the SL transmission, when the first device does not transmit a SL HARQ feedback for the SL HARQ process on the PUCCH resource due to a measurement gap or a LBT failure (step 1034), starting or restarting a second timer for the SL HARQ process in a first symbol, after expiration of the first timer, when the first device does not transmit the SL HARQ feedback for the SL HARQ process on the PUCCH resource due to the measurement gap, or the LBT failure, and the SL HARQ feedback is a NACK (step 1036), and monitoring a PDCCH when the second timer is running (step 1038).

In various embodiments, the method further comprises performing the SL transmission via the SL HARQ process to a second device (e.g., a second UE).

In various embodiments, the method further comprises receiving a SL HARQ feedback for the SL transmission from a second device.

In various embodiments, the SL HARQ feedback for the SL transmission is a NACK.

In various embodiments, the method further comprises determining the SL HARQ feedback for the SL HARQ process based on the SL HARQ feedback for the SL transmission (received from a second device).

In various embodiments, the method further comprises instructing a physical layer of the first device to signal a negative acknowledgement on the PUCCH resource if or when a retransmission is required for the SL transmission.

In various embodiments, the first timer is drx-HARQ-RTT-TimerSL.

In various embodiments, the second timer is drx-RetransmissionTimerSL.

In various embodiments, the first device is configured with the PUCCH resource for transmitting the SL HARQ feedback for the SL HARQ process.

In various embodiments, the first device is indicated or configured with a DRX configuration associated with SL, wherein the DRX configuration indicates one or more timers including the first timer and the second timer associated with the PDCCH monitoring.

Referring back to FIGS. 3 and 4, in one or more embodiments from the perspective of a first device, the device 300 includes a program code 312 stored in memory 310 of the transmitter. The CPU 308 could execute program code 312 to: (i) receive a SL grant, wherein the SL grant indicates a SL transmission; (ii) start or restart a first timer for a SL HARQ process in a first symbol after the end of a PUCCH resource associated with the SL grant, or the SL transmission, when the first device does not transmit a SL HARQ feedback for the SL HARQ process on the PUCCH resource due to a measurement gap or a LBT failure; (iii) start or restart a second timer for the SL HARQ process in a first symbol, after expiration of the first timer, when the first device does not transmit the SL HARQ feedback for the SL HARQ process on the PUCCH resource due to the measurement gap, or the LBT failure, and the SL HARQ feedback is a NACK; and (iv) monitor a PDCCH when the second timer is running. Moreover, the CPU 308 can execute the program code 312 to perform all of the described actions, steps, and methods described above, below, or otherwise herein.

Possible text proposals to 3GPP MAC specification based on [1] 3GPP 38.321 v17.0.0, in accordance with various embodiments disclosed herein, are shown below:

========================= Option 1 start (Section 5.28) ===========================

5.28 Sidelink Discontinuous Reception (DRX)

[...]

2> if the PDCCH indicates an SL transmission:

3> if the PUCCH resource is configured:

4> start the drx-HARQ-RTT-TimerSL for the corresponding HARQ process in the first symbol after the end of the corresponding PUCCH transmission carrying the SL HARQ feedback; or 4> start the drx-HARQ-RTT-TimerSL for the corresponding HARQ process in the first symbol after the end of the corresponding PUCCH resource for the SL HARQ feedback when the PUCCH is not transmitted due to UL/SL prioritization, measurement gap, or LBT failure indication;

4> stop the drx-RetransmissionTimerSL for the corresponding HARQ process.

[...]

================================ Option 1 end ================================

========================= Option 2 start (Section 5.28) ===========================

5.28 Sidelink Discontinuous Reception (DRX)

[...]

1> if a drx-HARQ-RTT-TimerSL expires:

2> if a HARQ NACK feedback for the corresponding HARQ process is transmitted on PUCCH; or 2> if a HARQ NACK feedback for the corresponding HARQ process is not transmitted on PUCCH due to UL/SL prioritization, measurement gap, or LBT failure indication:

3> start the drx-RetransmissionTimerSL for the corresponding HARQ process in the first symbol after the expiry of drx-HARQ-RTT-TimerSL.

-continued

```
    2>  else if the PUCCH resource is not configured and PSFCH is configured for the SL grant:
        3>  start the drx-RetransmissionTimerSL for the corresponding HARQ process in the first symbol
            after the expiry of drx-HARQ-RTT-TimerSL.
            [...]
================================ Option 2 end ================================
```

```
========================= Option 3 start (Section 5.28) ===========================
5.28    Sidelink Discontinuous Reception (DRX)
         [...]
  2>  if the PDCCH indicates an SL transmission:
    3>  if the PUCCH resource is configured:
      4>  start the drx-HARQ-RTT-TimerSL for the corresponding HARQ process in the first symbol
          after the end of the corresponding PUCCH transmission carrying the SL HARQ feedback; or
      4>  start the drx-HARQ-RTT-TimerSL for the corresponding HARQ process in the first symbol
          after the end of the corresponding PUCCH resource for the SL HARQ feedback when the
          PUCCH is not transmitted due to UL/SL prioritization or measurement gap;
      4>  stop the drx-RetransmissionTimerSL for the corresponding HARQ process.
    [...]
================================ Option 3 end ================================
```

```
========================= Option 4 start (Section 5.28) ===========================
5.28        Sidelink Discontinuous Reception (DRX)
             [...]
  1>  if a drx-HARQ-RTT-TimerSL expires:
    2>  if a HARQ NACK feedback for the corresponding HARQ process is transmitted on PUCCH; or
    2>  if a HARQ NACK feedback for the corresponding HARQ process is not transmitted on PUCCH due
        to UL/SL prioritization or measurement gap:
      3>  start the drx-RetransmissionTimerSL for the corresponding HARQ process in the first symbol
          after the expiry of drx-HARQ-RTT-TimerSL.
    2>  else if the PUCCH resource is not configured and PSFCH is configured for the SL grant:
      3>  start the drx-RetransmissionTimerSL for the corresponding HARQ process in the first symbol
          after the expiry of drx-HARQ-RTT-TimerSL.
          [...]
================================ Option 4 end ================================
```

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:

receiving a Sidelink (SL) grant, wherein the SL grant indicates a SL transmission;

starting or restarting a first timer for a SL Hybrid Automatic Repeat Request (HARQ) process in a first symbol after an end of a Physical Uplink Control Channel (PUCCH) resource associated with the SL grant, or the SL transmission, responsive to determining that the first device does not transmit a SL HARQ feedback for the SL HARQ process on the PUCCH resource due to a measurement gap or a Listen-Before-Talk (LBT) failure;

starting or restarting a second timer for the SL HARQ process in a first symbol, after expiration of the first timer, responsive to determining that the first device does not transmit the SL HARQ feedback for the SL HARQ process on the PUCCH resource due to the measurement gap, or the LBT failure, and the SL HARQ feedback is a Negative Acknowledgment (NACK); and monitoring a Physical Downlink Control Channel (PDCCH) responsive to determining that the second timer is running.

2. The method of claim 1, further comprising performing the SL transmission via the SL HARQ process to a second device.

3. The method of claim 1, further comprising receiving a SL HARQ feedback for the SL transmission from a second device.

4. The method of claim 3, wherein the SL HARQ feedback for the SL transmission is a NACK.

5. The method of claim 3, further comprising determining the SL HARQ feedback for the SL HARQ process based on the SL HARQ feedback for the SL transmission.

6. The method of claim 1, further comprising instructing a physical layer of the first device to signal a NACK on the PUCCH resource if or when a retransmission is required for the SL transmission.

7. The method of claim 1, wherein the first timer is drx-HARQ-RTT-TimerSL.

8. The method of claim 1, wherein the second timer is drx-RetransmissionTimerSL.

9. The method of claim 1, wherein the first device is configured with the PUCCH resource for transmitting the SL HARQ feedback for the SL HARQ process.

10. The method of claim 1, wherein the first device is indicated or configured with a Discontinuous Reception (DRX) configuration associated with SL, wherein the DRX configuration indicates one or more timers including the first timer and the second timer associated with the PDCCH monitoring.

11. A first device, comprising:

a memory; and a processor operatively coupled to the memory, wherein the processor is configured to execute program code to:

receive a Sidelink (SL) grant, wherein the SL grant indicates a SL transmission;

start or restart a first timer for a SL Hybrid Automatic Repeat Request (HARQ) process in a first symbol after an end of a Physical Uplink Control Channel (PUCCH) resource associated with the SL grant, or the SL transmission, responsive to determining that the first device does not transmit a SL HARQ feedback for the SL HARQ process on the PUCCH resource due to a measurement gap or a Listen-Before-Talk (LBT) failure;

start or restart a second timer for the SL HARQ process in a first symbol, after expiration of the first timer, responsive to determining that the first device does not transmit the SL HARQ feedback for the SL HARQ process on the PUCCH resource due to the measurement gap, or the LBT failure, and the SL HARQ feedback is a Negative Acknowledgment (NACK); and monitor a Physical Downlink Control Channel (PDCCH) responsive to determining that the second timer is running.

12. The first device of claim 11, wherein the processor is further configured to execute program code to perform the SL transmission via the SL HARQ process to a second device.

13. The first device of claim 11, wherein the processor is further configured to execute program code to receive a SL HARQ feedback for the SL transmission from a second device.

14. The first device of claim 13, wherein the SL HARQ feedback for the SL transmission is a NACK.

15. The first device of claim 13, wherein the processor is further configured to execute program code to determine the SL HARQ feedback for the SL HARQ process based on the SL HARQ feedback for the SL transmission.

16. The first device of claim 11, wherein the processor is further configured to execute program code to instruct a physical layer of the first device to signal a NACK on the PUCCH resource if or when a retransmission is required for the SL transmission.

17. The first device of claim 11, wherein the first timer is drx-HARQ-RTT-TimerSL.

18. The first device of claim 11, wherein the second timer is drx-RetransmissionTimerSL.

19. The first device of claim 11, wherein the first device is configured with the PUCCH resource for transmitting the SL HARQ feedback for the SL HARQ process.

20. The first device of claim 11, wherein the first device is indicated or configured with a Discontinuous Reception (DRX) configuration associated with SL, wherein the DRX configuration indicates one or more timers including the first timer and the second timer associated with the PDCCH monitoring.

* * * * *